United States Patent
Jung et al.

(10) Patent No.: US 10,117,129 B2
(45) Date of Patent: Oct. 30, 2018

(54) METHOD AND APPARATUS FOR BROADCASTING USING CHANNEL INFORMATION

(71) Applicant: Samsung Electronics Co.. Ltd., Gyeonggi-do (KR)

(72) Inventors: Euichang Jung, Seoul (KR); Suha Yoon, Seoul (KR); Hyuk Kang, Gyeonggi-do (KR); Jae-Woong Chun, Gyeonggi-do (KR); Cheolho Cheong, Seoul (KR)

(73) Assignee: Samsung Electronics Co., Ltd (KR)

( * ) Notice: Subject to any disclaimer, the term of this patent is extended or adjusted under 35 U.S.C. 154(b) by 99 days.

(21) Appl. No.: 15/254,283

(22) Filed: Sep. 1, 2016

(65) Prior Publication Data

US 2017/0086204 A1    Mar. 23, 2017

(30) Foreign Application Priority Data

Sep. 18, 2015 (KR) .................. 10-2015-0132578

(51) Int. Cl.
  *H04W 4/00* (2018.01)
  *H04W 28/02* (2009.01)
  (Continued)

(52) U.S. Cl.
  CPC ......... *H04W 28/0289* (2013.01); *H04W 4/06* (2013.01); *H04W 4/80* (2018.02); *H04W 16/28* (2013.01); *H04W 28/0263* (2013.01); *H04W 48/16* (2013.01); *H04W 8/005* (2013.01); *H04W 48/06* (2013.01)

(58) Field of Classification Search
  CPC ......... H04W 28/0289; H04W 28/0263; H04W 48/16; H04W 16/28; H04W 4/008; H04W 4/06; H04W 48/06; H04W 8/005
  See application file for complete search history.

(56) References Cited

U.S. PATENT DOCUMENTS 8,014,356 B2 *  9/2011  Tebbs .................... H04W 24/02
                                                    370/331
8,611,326 B2   12/2013  Huang
                        (Continued)

OTHER PUBLICATIONS

BluetoothAdapter, https://developer.android.com/reference/android/bluetooth/BluetoothAdapter.html, pp. 27.
(Continued)

*Primary Examiner* — Afshawn M Towfighi
(74) *Attorney, Agent, or Firm* — The Farrell Law Firm, P.C.

(57) ABSTRACT

Disclosed is a method and apparatus for supporting a beacon-based service. An electronic device may include a wireless communication module that may support short-range wireless communication and a processor that is functionally connected with the wireless communication module. The processor is configured to obtain a signal from at least one external device using the wireless communication module through the short-range wireless communication, determine at least one channel out of a plurality of channels based on at least a channel that obtains the signal or the intensity of the signal, and transmit, to another external device, a broadcasting signal using the at least one channel.

20 Claims, 16 Drawing Sheets

(51) Int. Cl.
*H04W 16/28* (2009.01)
*H04W 4/06* (2009.01)
*H04W 48/16* (2009.01)
*H04W 4/80* (2018.01)
*H04W 8/00* (2009.01)
*H04W 48/06* (2009.01)

(56) References Cited

U.S. PATENT DOCUMENTS

| | | | |
|---|---|---|---|
| 8,750,895 B2 | 6/2014 | Grosman et al. | |
| 9,020,433 B2* | 4/2015 | Linde | H04W 8/005 |
| | | | 455/39 |
| 9,860,600 B2* | 1/2018 | Kim | H04N 21/482 |
| 2010/0317289 A1* | 12/2010 | Desai | H04B 17/318 |
| | | | 455/41.2 |
| 2011/0153818 A1* | 6/2011 | Vandwalle | H04L 67/16 |
| | | | 709/224 |
| 2011/0319020 A1* | 12/2011 | Desai | H04L 63/02 |
| | | | 455/41.2 |
| 2014/0179276 A1* | 6/2014 | Kang | H04W 4/008 |
| | | | 455/411 |
| 2016/0014550 A1* | 1/2016 | Chiddarwar | H04W 4/008 |
| | | | 455/41.2 |
| 2016/0174022 A1* | 6/2016 | Nhu | H04W 4/008 |
| | | | 455/41.2 |

OTHER PUBLICATIONS

All what you need to know about Bluetooth Low Energy (BTLE) beacons, Copyright Accuware Inc. 2015-2016, pp. 2 https://www.accuware.com/support/knowledge-base/all-what-you-need-to-know-about-bluetooth-low-energy-btle-beacons/.
3GPP TS 23.303 V13.4.0 (Jun. 2016), Copyright 2016, 3GPP Organizational Partners (ARIB, ATIS, CCSA, ETSI, TSDSI, TTA, TIC), pp. 124.

* cited by examiner

METHOD AND APPARATUS FOR BROADCASTING USING CHANNEL INFORMATION

PRIORITY

This application claims priority under 35 U.S.C. § 119(a) to a Korean Patent Application which was filed in the Korean Intellectual Property Office on Sep. 18, 2015 and assigned Serial No. 10-2015-0132578, the contents of which are incorporated herein by reference.

BACKGROUND

1. Field of the Disclosure

The present disclosure relates generally to an electronic device, and more particularly, to a method and apparatus for providing a service to an electronic device that is located within a close distance.

2. Description of the Related Art

With the recent development of digital technologies, various types of electronic devices are widely used, such as a mobile communication terminal, a smart phone, a tablet personal computer (PC), a personal digital assistant (PDA), an electronic note, a notebook, a wearable device, and an Internet of Things (IoT) device. Various beacon-based services are now provided using Bluetooth™ Low Energy (BLE). For example, a push notification service is provided that informs of shopping information based on such services as the traffic line of a user, a proximity service (ProSe), and a location based service (LBS), such as location-based information delivery service.

To support various beacon-based services, a beacon device may support cellular communication, wireless fidelity communication (WiFi), and short-range wireless communication, such as Bluetooth (BT) communication or BLE communication. Various similar types of beacon devices, such as an IoT device, may coexist within limited spaces which correspond to various beacon-based services. In the space where beacon devices are installed or in the environment around the space, many user equipments may coexist, which receive various beacon-related services through the beacon devices, such as electronic devices. In the space where the beacon devices and user equipments exist or the environment around the space, there may exist wireless communication devices, such as an access point (AP) for wireless communication services, such as WiFi.

Recently, connectionless-based BLE is mostly used as the connectivity technology that determines approach and discovery between a beacon device and a user equipment. For example, a countless number of beacon devices and wireless communication devices may be installed together in an adjacent store and a section in the store. The beacon devices and the wireless communication devices may be used for forming the internal map of a building or for recognizing the location of the user equipment and providing an additional service.

When various types of devices that use a plurality of nonlicensed bands, such as bands used by BT, BLE, WiFi, or ZigBee coexist, interference may occur between a user equipment and a beacon device, such as a cellular/long term evolution (LTE) signage, a machine to machine (M2M) device, or the like as an IoT device) that is provided by a predetermined manager/provider, the interference being due to other beacon devices or wireless communication devices. For example, an existing beacon device fixedly uses a channel that broadcasts an advertising packet and a broadcasting period. In this instance, the frequency that the beacon device uses may overlap the frequency of another device, such as a wireless communication device, a user equipment, and the like) that has a strong transmission power. Therefore, the beacon device may have difficulty in avoiding interference caused by other devices around the beacon device, and may have difficulty in efficiently performing data transmission and discovery with respect to the user equipment. For example, beacon devices may share a channel with a wireless communication device existing around the beacon devices, and thus, interference may increase. When a large number of beacon devices and wireless communication devices exist around a user equipment, the user equipment may continuously receive a large number of beacon signals and wireless communication signals, and thus, the amount of battery power consumed may increase.

SUMMARY

The present disclosure has been made to address the above-mentioned problems and disadvantages, and to provide at least the advantages described below.

Accordingly, an aspect of the present disclosure is to provide a method and apparatus for providing improvements in discovery and power use efficiency, and for a proximity service or location-based service in an electronic device.

Another aspect of the present disclosure is to provide a method and an apparatus for improving discovery by reducing interference from another device for the operations between a beacon device and a user equipment in a situation in which various types of devices, such as a beacon device, a wireless communication device, and a user equipment coexist and use a plurality of unlicensed bands.

Another aspect of the present disclosure is to provide a method and apparatus for a user equipment to efficiently filter a predetermined beacon device out of various beacon devices existing around the user equipment.

Another aspect of the present disclosure is to provide a method and apparatus for reducing the amount of power consumed when a user equipment receives signals from other beacon devices by enabling the user equipment to accurately and promptly discover a selected beacon device when the user equipment executes access in an environment where various beacon devices are installed inside or outside.

According to an aspect of the present disclosure, electronic device includes a wireless communication module configured to support short-range wireless communication, and a processor configured to be functionally connected with the wireless communication module, wherein the processor is configured to obtain a signal from at least one external device through the short-range wireless communication, using the wireless communication module, determine at least one channel out of a plurality of channels, based on at least one channel that obtains the signal and the intensity of the signal, and transmit a broadcasting signal to another external device using the at least one channel.

According to another aspect of the present disclosure, an electronic device includes a communication module configured to establish a connection with a first external device or a second external device, and a processor configured to be functionally connected with the communication module, receive data including at least one signal from the first external device through the communication module, determine at least one channel out of a plurality of channels based on the data, and transmit information associated with the at least one channel to the first external device or the second external device, and enable the first external device to transmit a broadcasting signal using the at least one channel.

According to another aspect of the present disclosure, an electronic device includes a communication module configured to establish a connection with an external device, and a processor configured to be functionally connected with the communication module, obtain a signal in a resource area set for discovering an adjacent device that is capable of performing device-to-device (D2D) communication through the communication module, determine some resource area out of the resource area based on the intensity of the obtained signal, and transmit a discovery signal using the determined resource area.

According to another aspect of the present disclosure, an operation method of an electronic device includes obtaining, using a wireless communication module, a signal from at least one external device through short-range wireless communication, determining at least one channel out of a plurality of channels based on at least one channel that obtains the signal and the intensity of the signal, and transmitting a broadcasting signal to another external device using the at least one channel.

According to another aspect of the present disclosure, a method of an electronic device includes receiving data including at least one signal from a first external device through a communication module, determining at least one channel out of a plurality of channels based on the data; and transmitting information associated with the at least one channel to the first external device or a second external device, and enabling the first external device to transmit a broadcasting signal using the at least one channel.

According to another aspect of the present disclosure, a method of an electronic device includes receiving channel information to be used for an external device, changing a (scan) period with respect to a channel corresponding to the channel information based on at least the reception, and receiving a signal broadcasted from the external device using the changed (scan) period.

To solve the above described problems, embodiments of the present disclosure may include a computer-readable recording medium that stores a program for implementing the method in a processor.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION OF EMBODIMENTS OF THE DISCLOSURE

Figure 1:
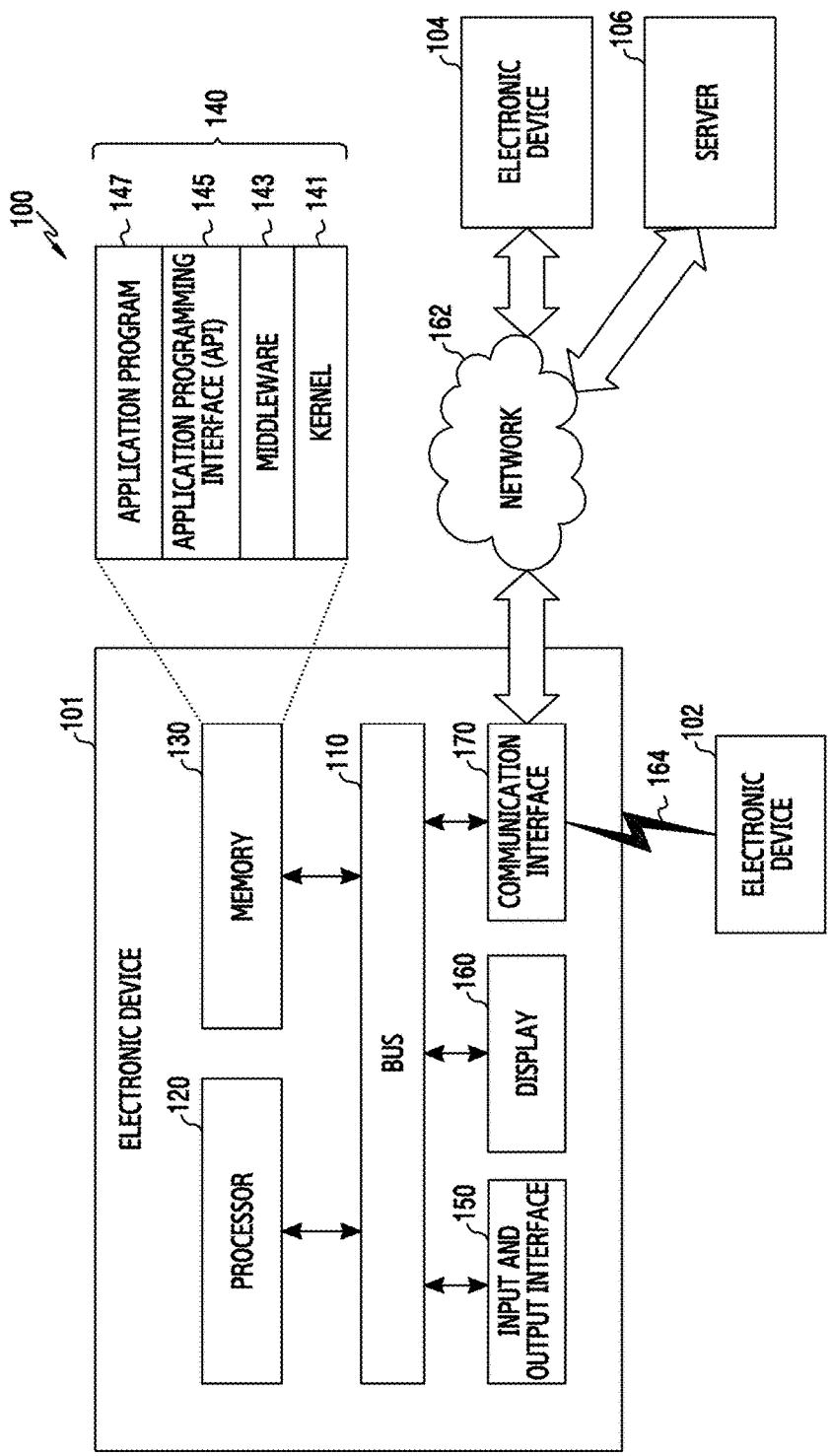
FIG. 1 illustrates a network environment including an electronic device according to embodiments of the present disclosure.

Hereinafter, embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

As used herein, the expressions "have", "may have", "include", and "may include" refer to the existence of a corresponding feature, such as a numeral, function, operation, or constituent element such as component, and do not exclude one or more additional features.

In the present disclosure, the expressions "A or B", "at least one of A or/and B", and "one or more of A or/and B" may include all possible combinations of the items listed. For example, the expressions "A or B", "at least one of A and B", and "at least one of A or B" refers to all of (1) including at least one A, (2) including at least one B, or (3) including all of at least one A and at least one B.

The expressions "a first", "a second", "the first", and "the second" used in embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

When an element, such as first element, is referred to as being operatively or communicatively "connected," or "coupled," to another element, such as second element, the first element may be directly connected or coupled directly to the second element or any other element, such as a third element, may be interposed between the first and second elements. In contrast, it may be understood that when the first element is referred to as being "directly connected," or "directly coupled" to the second element, there is no third element interposed between the first and second elements.

The expression "configured to" used in the present disclosure may be exchanged with "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a generic-purpose processor, such as central processing unit (CPU) or application processor (AP) that can perform the corresponding operations by executing one or more software programs stored in a memory device.

The terms used in the present disclosure are only used to describe specific embodiments, and are not intended to limit the present disclosure. As used herein, singular forms may include plural forms as well unless the context clearly indicates otherwise. Unless defined otherwise, all terms used herein, including technical and scientific terms, have the same meanings as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined as such in the present disclosure. In some cases, even a term defined in the present disclosure should not be interpreted to exclude embodiments of the present disclosure.

An electronic device according to embodiments of the present disclosure may include at least one of a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a motion pictures experts group (MPEG)-1 audio layer-3 (MP3) player, a mobile medical device, a camera, and a wearable device.

According to embodiments, the wearable device may include at least one of an accessory type, such as a watch, ring, bracelet, anklet, necklace, glasses, contact lens, or a head-mounted device (HMD), a fabric or clothing integrated type, such as electronic clothing, a body-mounted type, such as a skin pad or tattoo, and a bio-implantable type, such as an implantable circuit.

According to some embodiments, the electronic device may be a home appliance. The home appliance may include at least one of a television, a digital video disk (DVD) player, an audio, a refrigerator, an air conditioner, a vacuum cleaner, an oven, a microwave oven, a washing machine, an air cleaner, a set-top box, a home automation control panel, a security control panel, a television (TV) box, such as Samsung HomeSync™, Apple TV™, or Google TV™, a game console, such as Xbox™ and PlayStation™, an electronic dictionary, an electronic key, a camcorder, and an electronic photo frame.

According to another embodiment, the electronic device may include at least one of various medical devices, such as various portable medical measuring devices including a blood glucose monitoring device, a heart rate monitoring device, a blood pressure measuring device, and a body temperature measuring device, a magnetic resonance angiography (MRA), a magnetic resonance imaging (MRI), a computed tomography (CT) machine, and an ultrasonic machine, a navigation device, a global positioning system (GPS) receiver, an event data recorder (EDR), a flight data recorder (FDR), a vehicle infotainment device, an electronic device for a ship, such as a navigation device and a gyrocompass, avionics, security devices, an automotive head unit, a robot for home or industry, an automated teller machine (ATM), point of sales (POS) device, or an IoT device such as a light bulb, various sensors, electric or gas meter, sprinkler device, fire alarm, thermostat, streetlamp, toaster, sporting goods, hot water tank, heater, and a boiler.

According to some embodiments, the electronic device may include at least one of a part of furniture or a building/structure, an electronic board, an electronic signature receiving device, a projector, and various kinds of measuring instruments, such as a water meter, an electric meter, a gas meter, and a radio wave meter. The electronic device according to embodiments of the present disclosure may be a combination of one or more of the aforementioned various devices. The electronic device according to some embodiments of the present disclosure may be a flexible device. The electronic device according to an embodiment of the present disclosure is not limited to the aforementioned devices, and may include a new electronic device according to the development of technology.

Herein, the term "user" may indicate a person who uses an electronic device or a device, such as an artificial intelligence electronic device that uses an electronic device.

FIG. 1 illustrates a network environment including an electronic device according to embodiments of the present disclosure.

An electronic device 101 within a network environment 100 will be described with reference to FIG. 1. The electronic device 101 may include a bus 110, a processor 120, a memory 130, an input/output interface 150, a display 160, and a communication interface 170. According to an embodiment of the present disclosure, the electronic device 101 may omit at least one of the above components or may further include other components.

The bus 110 may include a circuit which interconnects the components 110 to 170 and delivers a communication, such as a control message and/or data between the components 110 to 170.

The processor 120 may include one or more of a central processing unit (CPU), an application processor (AP), and a communication processor (CP). The processor 120 may carry out calculation or data processing relating to control and/or communication of at least one other component of the electronic device 101.

The memory 130 may include a volatile memory and/or a non-volatile memory. The memory 130 may store commands or data relevant to at least one other component of the electronic device 101. According to an embodiment of the present disclosure, the memory 130 may store software and/or a program 140. The program 140 may include a kernel 141, middleware 143, an application programming interface (API) 145, and/or application programs (or applications 147. At least some of the kernel 141, the middleware 143, and the API 145 may be referred to as an operating system (OS).

The kernel 141 may control or manage system resources, such as the bus 110, the processor 120, or the memory 130 used for performing an operation or function implemented in the other programs, such as the middleware 143, the API 145, or the application programs 147. Furthermore, the kernel 141 may provide an interface through which the middleware 143, the API 145, or the application programs 147 may access the individual components of the electronic device 101 to control or manage the system resources.

The middleware 143 may serve as an intermediary for allowing the API 145 or the application programs 147 to communicate with the kernel 141 to exchange data.

The middleware 143 may process one or more task requests received from the application programs 147 according to priorities thereof. For example, the middleware 143 may assign priorities for using the system resources of the electronic device 101, to at least one of the application programs 147. For example, the middleware 143 may perform scheduling or loading balancing on the one or more task requests by processing the one or more task requests according to the priorities assigned thereto.

The API 145 is an interface through which the application programs 147 control functions provided from the kernel 141 or the middleware 143, and may include at least one interface or function for file control, window control, image processing, character control, and the like.

The input/output interface 150 may function as an interface that may transfer commands or data input from a user or another external device to the other element(s) of the electronic device 101. Furthermore, the input/output interface 150 may output the commands or data received from the other element(s) of the electronic device 101 to the user or another external device.

Examples of the display 160 may include a liquid crystal display (LCD), a light-emitting diode (LED) display, an organic light-emitting diode (OLED) display, a microelectromechanical systems (MEMS) display, and an electronic paper display. The display 160 may display various types of contents, such as text, images, videos, icons, or symbols to users. The display 160 may include a touch screen, and may receive a touch, gesture, proximity, or hovering input using an electronic pen or a user's body part.

The communication interface 170 may establish communication between the electronic device 101 and an external device, such as a first external electronic device 102, a second external electronic device 104, or a server 106. For example, the communication interface 170 may be connected to a network 162 through wireless or wired communication, and may communicate with an external device, such as the second external electronic device 104 or the server 106. The wireless communication may use at least one of long term evolution (LTE), LTE-advanced (LTE-A), code division multiple access (CDMA), wideband CDMA (WCDMA), universal mobile telecommunications system (UMTS), wireless broadband (WiBro), and global system for mobile communications (GSM), as a cellular communication protocol. The wireless communication may also include short-range communication 164 such as Wi-Fi, BT, near field communication (NFC), and a global navigation satellite system (GNSS) such as global positioning system (GPS), Beidou navigation satellite system (Beidou) or Galileo, and the European global satellite-based navigation system, based on a location or a bandwidth, for example. Hereinafter, "GPS" may be interchangeably used with "GNSS". The wired communication may include at least one of a universal serial bus (USB), a high definition multimedia interface (HDMI), recommended standard 232 (RS-232), and a plain old telephone service (POTS). The network 162 may include at least one of a telecommunication network, such as a local area network (LAN) or a wide area network (WAN), the Internet, and a telephone network.

Each of the first and second external electronic devices 102 and 104 may be of a type identical to or different from that of the electronic device 101. The server 106 may include a group of one or more servers. All or some of the operations performed in the electronic device 101 may be executed in another electronic device or a plurality of electronic devices. When the electronic device 101 has to perform some functions or services automatically or in response to a request, the electronic device 101 may request another device, such as the electronic device 102 or 104 or the server 106, to execute at least some functions relating thereto instead of or in addition to autonomously performing the functions or services. The electronic device 102 or 104, or the server 106 may execute the requested functions or the additional functions, and may deliver a result of the execution to the electronic device 101. The electronic device 101 may process the received result as it is or additionally, and may provide the requested functions or services. To this end cloud computing, distributed computing, or client-server computing technologies may be used.

Figure 2:
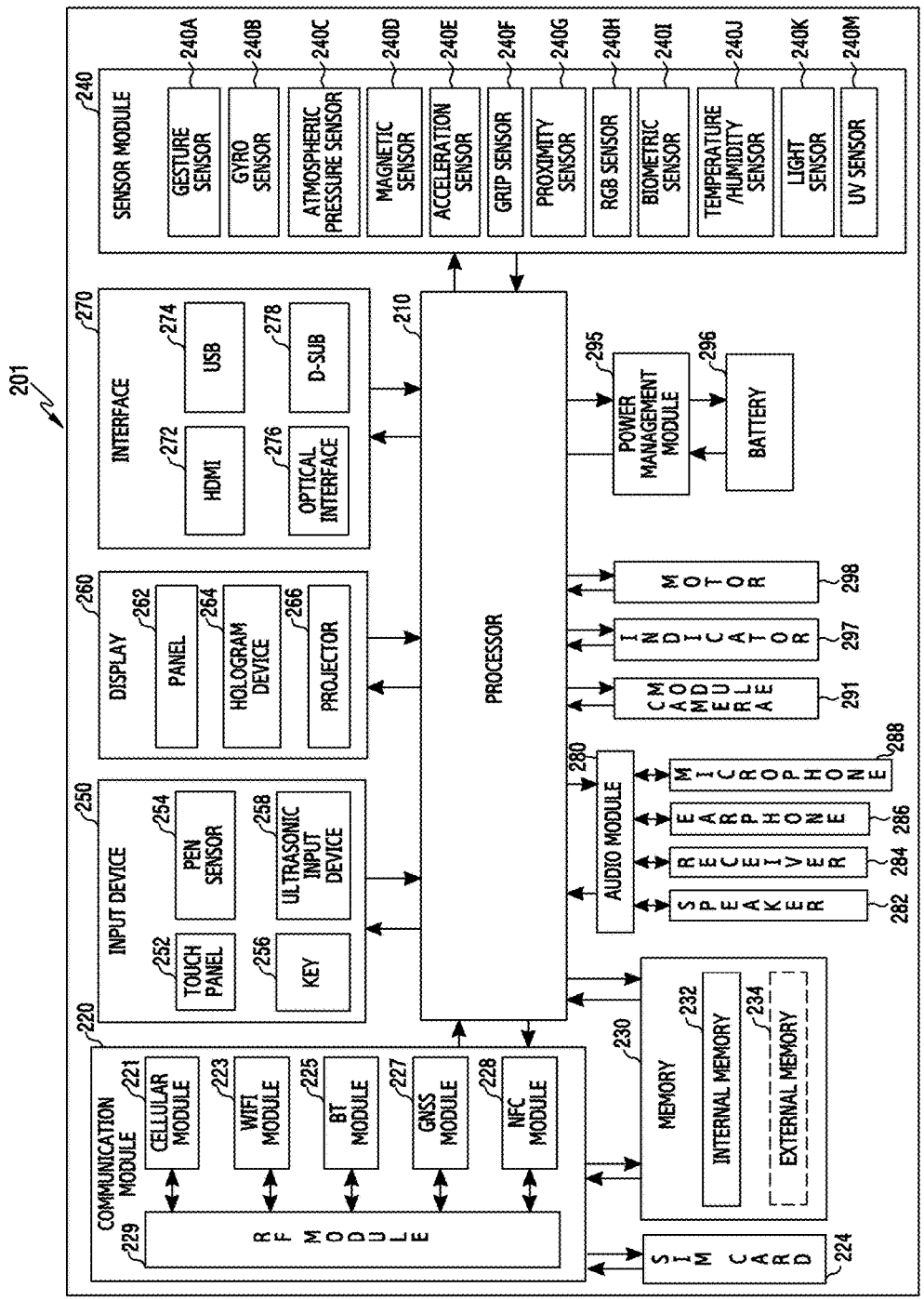
FIG. 2 is a block diagram of an electronic device according to embodiments of the present disclosure.

FIG. 2 is a block diagram of an electronic device according to embodiments of the present disclosure.

The electronic device 201 may include all or a part of the electronic device 101 shown in FIG. 1. The electronic device 201 may include one or more processors 210, such as an application processor (AP), communication module 220, subscriber identification module (SIM) card 224, memory 230, sensor module 240, input device 250, display 260, interface 270, audio module 280, camera module 291, power management module 295, battery 296, indicator 297, and a motor 298.

The processor 210 may control a plurality of hardware or software components connected to the processor 210 by driving an operating system or an application program, and perform processing of various pieces of data and calculations. The processor 210 may be embodied as a system on chip (SoC). According to an embodiment of the present disclosure, the processor 210 may further include a graphic processing unit (GPU) and/or an image signal processor. The processor 210 may include at least some (for example, a cellular module 221) of the components illustrated in FIG. 2. The processor 210 may load, into a volatile memory, commands or data received from at least one non-volatile memory of the other components and may process the loaded commands or data, and may store various data in a non-volatile memory.

The communication module 220 may have a configuration equal or similar to that of the communication interface 170 of FIG. 1. The communication module 220 may include a cellular module 221, a Wi-Fi module 223, a BT module 225, a GNSS module 227, an NFC module 228, and a radio frequency (RF) module 229.

The cellular module 221 may provide a voice call, a video call, a text message service, or an Internet service through a communication network. According to an embodiment of the present disclosure, the cellular module 221 may distinguish and authenticate the electronic device 201 in a communication network using the subscriber identification module 224 (for example, the SIM card). According to an embodiment of the present disclosure, the cellular module 221 may perform at least some of the functions that the AP 210 may provide. According to an embodiment of the present disclosure, the cellular module 221 may include a communication processor (CP).

For example, each of the Wi-Fi module 223, the BT module 225, the GNSS module 227, and the NFC module 228 may include a processor for processing data transmitted/received through a corresponding module. According to an embodiment of the present disclosure, at least two of the cellular module 221, the Wi-Fi module 223, the BT module 225, the GNSS module 227, and the NFC module 228 may be included in one integrated chip (IC) or IC package.

The RF module 229 may transmit/receive a communication signal, such as an RF signal and may include a transceiver, a power amplifier module (PAM), a frequency filter, a low noise amplifier (LNA), and an antenna. According to another embodiment of the present disclosure, at least one of the cellular module 221, the WIFI module 223, the BT module 225, the GNSS module 227, and the NFC module 228 may transmit/receive an RF signal through a separate RF module.

The subscriber identification module 224 may include a card including a subscriber identity module and/or an embedded SIM, and may contain unique identification information, such as an integrated circuit card identifier (ICCID) or subscriber information, such as an international mobile subscriber identity (IMSI)).

The memory 230 may include an embedded memory 232 or an external memory 234. The embedded memory 232 may include at least one of a volatile memory, such as a dynamic random access memory (DRAM), a static RAM (SRAM), and a synchronous dynamic RAM (SDRAM), and a non-volatile memory, such as a one time programmable read only memory (OTPROM), a programmable ROM (PROM), an erasable and programmable ROM (EPROM), an electrically erasable and programmable ROM (EEPROM), a mask ROM, a flash ROM, a flash memory, such as a NAND flash memory or a NOR flash memory, a hard disc drive, and a solid state drive (SSD).

The external memory 234 may further include a flash drive a compact flash (CF), a secure digital (SD), a micro secure digital (Micro-SD), a mini secure digital (Mini-SD), an extreme digital (xD), a multimedia card (MMC), or a memory stick. The external memory 234 may be functionally and/or physically connected to the electronic device 201 through various interfaces.

The sensor module 240 may measure a physical quantity or detect an operation state of the electronic device 201, and may convert the measured or detected information into an electrical signal. The sensor module 240 may include at least one of a gesture sensor 240A, a gyro sensor 240B, an atmospheric pressure sensor (barometer) 240C, a magnetic sensor 240D, an acceleration sensor 240E, a grip sensor 240F, a proximity sensor 240G, a color sensor 240H, such as red, green, and blue (RGB) sensor), a biometric sensor (medical sensor) 240I, a temperature/humidity sensor 240J, an illuminance sensor 240K, and a ultra violet (UV) sensor 240M. Additionally or alternatively, the sensor module 240 may include an E-nose sensor, an electromyography (EMG) sensor, an electroencephalogram (EEG) sensor, an electrocardiogram (ECG) sensor, an infrared (IR) sensor, an iris scan sensor, and/or a finger scan sensor. The sensor module 240 may further include a control circuit for controlling one or more sensors included therein. According to an embodiment of the present disclosure, the electronic device 201 may further include a processor configured to control the sensor module 240, as a part of the processor 210 or separately from the processor 210, and may control the sensor module 240 while the processor 210 is in a sleep state.

The input device 250 may include a touch panel 252, a (digital) pen sensor 254, a key 256, or an ultrasonic input device 258. The touch panel 252 may use at least one of a capacitive type, a resistive type, an infrared type, and an ultrasonic type. The touch panel 252 may further include a control circuit. The touch panel 252 may further include a tactile layer, and provide a tactile reaction to the user.

The (digital) pen sensor 254 may include a recognition sheet which is a part of the touch panel or is separated from the touch panel. The key 256 may include a physical button, an optical key or a keypad. The ultrasonic input device 258 may detect, through a microphone 288, ultrasonic waves generated by an input tool, and identify data corresponding to the detected ultrasonic waves.

The display 260 may include a panel 262, a hologram device 264, or a projector 266. The panel 262 may include a configuration identical or similar to the display 160 illustrated in FIG. 1. The panel 262 may be implemented to be flexible, transparent, or wearable. The panel 262 may be embodied as a single module with the touch panel 252. The hologram device 264 may show a three dimensional (3D) image in the air by using an interference of light. The projector 266 may project light onto a screen to display an image. The screen may be located in the interior of or on the exterior of the electronic device 201. According to an embodiment of the present disclosure, the display 260 may further include a control circuit for controlling the panel 262, the hologram device 264, or the projector 266.

The interface 270 may include a high-definition multimedia interface (HDMI) 272, a universal serial bus (USB) 274, an optical interface 276, or a d-subminiature (D-sub) 278. The interface 270 may be included in the communication interface 170 illustrated in FIG. 1. Additionally or alternatively, the interface 270 may include a mobile high-definition link (MHL) interface, a secure digital (SD) card/multimedia card (MMC) interface, or an infrared data association (IrDA) standard interface.

The audio module 280 may bilaterally convert a sound and an electrical signal. At least some components of the audio module 280 may be included in the input/output interface 150 illustrated in FIG. 1. The audio module 280 may process voice information input or output through a speaker 282, a receiver 284, earphones 286, or the microphone 288.

The camera module 291 is a device which may photograph a still image and a video. According to an embodiment of the present disclosure, the camera module 291 may include one or more image sensors, such as a front sensor or a back sensor, a lens, an image signal processor (ISP) or a flash, such as a light emitting diode (LED) or xenon lamp.

The power management module 295 may manage power of the electronic device 201. According to an embodiment of the present disclosure, the power management module 295 may include a power management integrated circuit (PMIC), a charger integrated circuit (IC), or a battery gauge. The PMIC may use a wired and/or wireless charging method. Examples of the wireless charging method may include a magnetic resonance method, a magnetic induction method, and an electromagnetic wave method. Additional circuits, such as a coil loop, a resonance circuit, or a rectifier, for wireless charging may be further included. The battery gauge may measure a residual quantity of the battery 296, and a voltage, a current, or a temperature while charging. The battery 296 may include a rechargeable battery and/or a solar battery.

The indicator 297 may display a particular state, such as a booting state, a message state, or a charging state of the electronic device 201 or a part of the electronic device 201. The motor 298 may convert an electrical signal into a mechanical vibration, and may generate a vibration, a haptic effect, or the like. The electronic device 201 may include a processing device, such as a graphic processing unit (GPU) for supporting a mobile TV. The processing device for supporting a mobile TV may process media data according to a certain standard such as digital multimedia broadcasting (DMB), digital video broadcasting (DVB), or mediaFLO™.

Each of the above-described component elements of hardware according to the present disclosure may be configured with one or more components, and the names of the corresponding component elements may vary based on the type of electronic device. The electronic device may include at least one of the above-described elements. Some of the above-described elements may be omitted from the electronic device, or the electronic device may further include additional elements. Also, some of the hardware components according to embodiments may be combined into one entity, which may perform functions identical to those of the relevant components before the combination.

Figure 3:
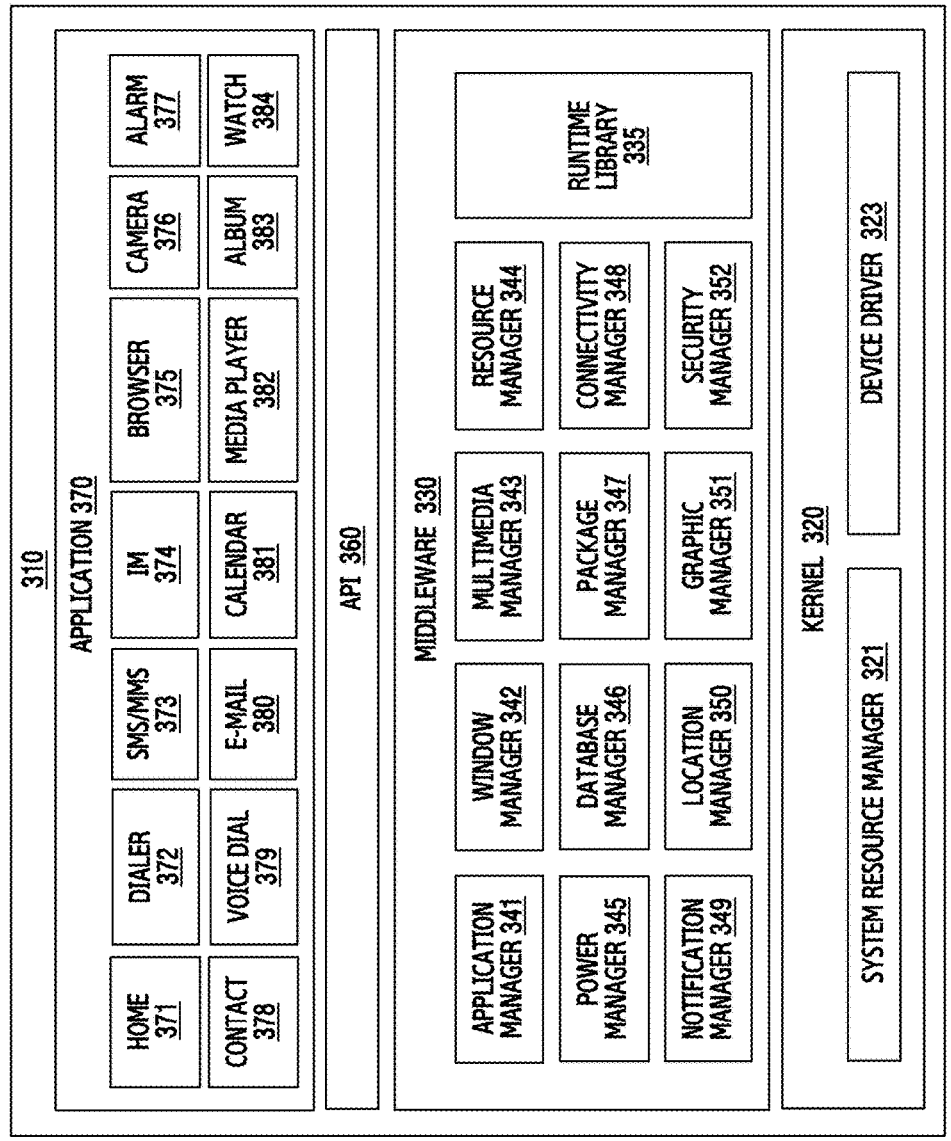
FIG. 3 is a block diagram of a program module according to embodiments of the present disclosure.

FIG. 3 is a block diagram of a program module according to embodiments of the present disclosure.

According to an embodiment of the present disclosure, the program module 310 may include an operating system (OS) for controlling resources related to the electronic device 101 and/or various applications (e.g., the application programs 147) executed in the operating system. The operating system may be Android, iOS, Windows, Symbian, Tizen, or Bada, for example.

The program module 310 may include a kernel 320, middleware 330, an API 360, and/or application 370. At least some of the program module 310 may be preloaded on an electronic device, or may be downloaded from an external electronic device.

The kernel 320 may include a system resource manager 321 and/or a device driver 323. The system resource manager 321 may control, allocate, or collect system resources. According to an embodiment of the present disclosure, the system resource manager 321 may include a process management unit, a memory management unit, a file system management unit, and the like. The device driver 323 may include a display driver, a camera driver, a BT driver, a shared memory driver, a USB driver, a keypad driver, a Wi-Fi driver, an audio driver, or an inter-process communication (IPC) driver.

For example, the middleware 330 may provide a function required in common by the application 370, or may provide various functions to the application 370 through the API 360 so as to enable the application 370 to efficiently use the limited system resources in the electronic device. According to an embodiment of the present disclosure, the middleware 330 may include at least one of a run time library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses in order to add a new function through a programming language while an application 370 is being executed. The runtime library 335 may perform input/output management, memory management, the functionality for an arithmetic function, or the like.

The application manager 341 may manage a life cycle of at least one of the application 370. The window manager 342 may manage graphical user interface (GUI) resources used by a screen. The multimedia manager 343 may recognize a format required for reproduction of various media files, and may perform encoding or decoding of a media file by using a codec suitable for the corresponding format. The resource manager 344 may manage resources of a source code, a memory, and a storage space of at least one of the application 370.

The power manager 345 may operate together with a basic input/output system (BIOS) or the like to manage a battery or power source and may provide power information or the like required for the operations of the electronic device. The database manager 346 may generate, search for, and/or change a database to be used by at least one of the application 370. The package manager 347 may manage installation or an update of an application distributed in a form of a package file.

For example, the connectivity manager 348 may manage wireless connectivity such as Wi-Fi or Bluetooth. The notification manager 349 may display or notify of an event such as an arrival message, promise, proximity notification, and the like in such a way that does not disturb a user. The location manager 350 may manage location information of an electronic device. The graphic manager 351 may manage a graphic effect which will be provided to a user, or a user interface related to the graphic effect. The security manager 352 may provide all security functions required for system security, user authentication, or the like. According to an embodiment of the present disclosure, when the electronic device has a telephone call function, the middleware 330 may further include a telephony manager for managing a voice call function or a video call function of the electronic device.

The middleware 330 may include a middleware module that forms a combination of various functions of the above-described components. The middleware 330 may provide a module specialized for each type of OS in order to provide a differentiated function. The middleware 330 may dynamically remove some of the existing components or add new components.

The API 360 is a set of API programming functions, and may be provided with a different configuration according to an OS. For example, in the case of Android or iOS, one API set may be provided for each platform. In the case of Tizen, two or more API sets may be provided for each platform.

The application 370 (e.g., the application programs 147) may include one or more applications which may provide functions such as a home 371, a dialer 372, a short message service/multimedia messaging service (SMS/MMS) 373, an instant message (IM) 374, a browser 375, a camera 376, an alarm 377, contacts 378, a voice dial 379, an email 380, a calendar 381, a media player 382, an album 383, a clock 384, health care, such as measuring exercise quantity or blood sugar, or environment information, such as providing atmospheric pressure, humidity, or temperature information.

According to an embodiment of the present disclosure, the application 370 may include an information exchange application that supports exchanging information between the electronic device 101 and an external electronic device 102 or 104. The information exchange application may include a notification relay application for transferring specific information to an external electronic device or a device management application for managing an external electronic device.

For example, the notification relay application may include a function of transferring, to the external electronic device 102 or 104, notification information generated from other applications of the electronic device 101, such as an SMS/MMS, email, health management, or environmental information application. The notification relay application may receive notification information from an external electronic device and provide the received notification information to a user.

The device management application installs, deletes, or updates at least one function of an external electronic device 102 or 104 communicating with the electronic device, such as turning on/off the external electronic device or adjusting the brightness of the display, applications operating in the external electronic device, and services provided by the external electronic device, such as a call or message service.

The application 370 may include a health care application of a mobile medical appliance, designated according to an external electronic device 102 or 104. The application 370 may include an application received from an external electronic device, and may include a preloaded application or a third party application that may be downloaded from a server. The names of the components of the program module 310 of the illustrated embodiment of the present disclosure may change according to the type of operating system.

At least a part of the programming module 310 may be implemented in software, firmware, hardware, or a combination of two or more thereof. At least some of the program module 310 may be implemented by the processor. At least some of the program module 310 may include a module, a program, a routine, a set of instructions, and/or a process for performing one or more functions.

The term "module" as used herein may indicate a unit including one of hardware, software, and firmware or a combination of two or more of them. The "module" may be interchangeably used with the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an application-specific integrated circuit (ASIC) chip, a field-programmable gate array (FPGA), and a programmable-logic device for performing operations which has been known or are to be developed hereinafter.

At least some of the devices or the method according to the present disclosure may be implemented by a command stored in a computer-readable storage medium in a programming module form. The instruction, when executed by a processor, may cause the one or more processors to execute the function corresponding to the instruction. The computer-readable recoding media may be the memory 130.

The computer readable recoding medium may include a hard disk, a floppy disk, magnetic media, such as a magnetic tape, optical media, such as a compact disc read only memory (CD-ROM) and a digital versatile disc (DVD), magneto-optical media, such as a floptical disk, a hardware device, such as a read only memory (ROM), a random access memory (RAM), or a flash memory, for example. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

Any of the modules or programming modules according to embodiments of the present disclosure may include at least one of the above described elements, exclude some of the elements, or further include other additional elements. The operations performed by the modules, programming module, or other elements according to embodiments of the present disclosure may be executed in a sequential, parallel, repetitive, or heuristic manner. Further, some operations may be executed according to another order or may be omitted, or other operations may be added.

Embodiments of the present disclosure disclose a discovery improving method and apparatus of an electronic device for a beacon-based service, and a method and apparatus for improving the discovery performance of an electronic device for a proximity service (ProSe) or a location based service (LBS).

An electronic device, according to embodiments of the present disclosure, may include all devices that support a communication function and use one or more processors out of the various processors, such as an application processor (AP), a communication processor (CP), a graphic processing unit (GPU), or a central processing unit (CPU). For example, an electronic device, according to embodiments of the present disclosure, may include all information communication devices, multimedia devices, wearable devices, Internet of things (IoT) devices, and application devices thereof, which support a communication function.

An electronic device may be described by distinguishing the electronic device as a beacon device, a wireless communication device, or a user equipment, for ease of description. According to embodiments of the present disclosure, a beacon device may include IoT devices, such as a cellular signage, a long-term evolution (LTE) signage, or an M2M device, and may be used as a term including a device for a beacon-based service. A beacon device may be referred to as a signage, for distinguishing the beacon device from other beacon devices for ease of description of operations.

The wireless communication device includes an access point (AP), and may be used as a term including a device for providing a wireless communication service, such as a WiFi, to a user equipment.

A user equipment includes a smart phone or a tablet personal computer (PC), and may be used as a term including a device that enters the service radius of at least one of a signage, a beacon device, and a wireless communication device, and is provided with a corresponding service from the signage, the beacon device, or the wireless communication device.

Hereinafter, the discovery improving method and apparatus of an electronic device according to embodiments of the present disclosure will be described with reference to attached drawings. However, since the embodiments are not restricted or limited by the following description, it should be noted that applications can be made to the embodiments based on embodiments that will be described below.

Hereinafter, embodiments of the present disclosure will be described based on an approach of hardware, but also include a technology that uses both hardware and software. Thus, the embodiments of the present disclosure may not exclude the perspective of software.

Figure 4:
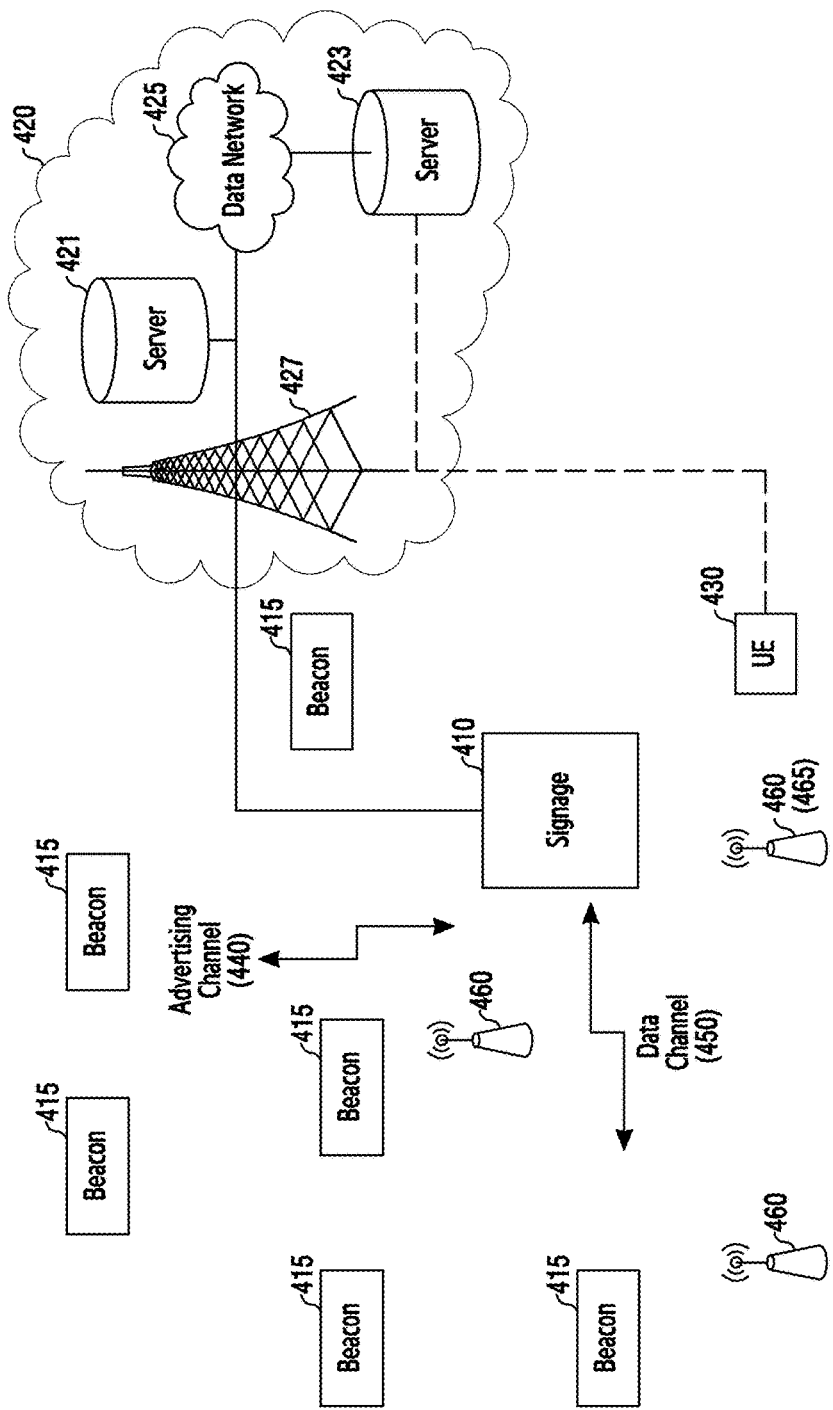
FIGS. 4 and 5 illustrate operations of an electronic device in a system according to embodiments of the present disclosure.
Figure 5:
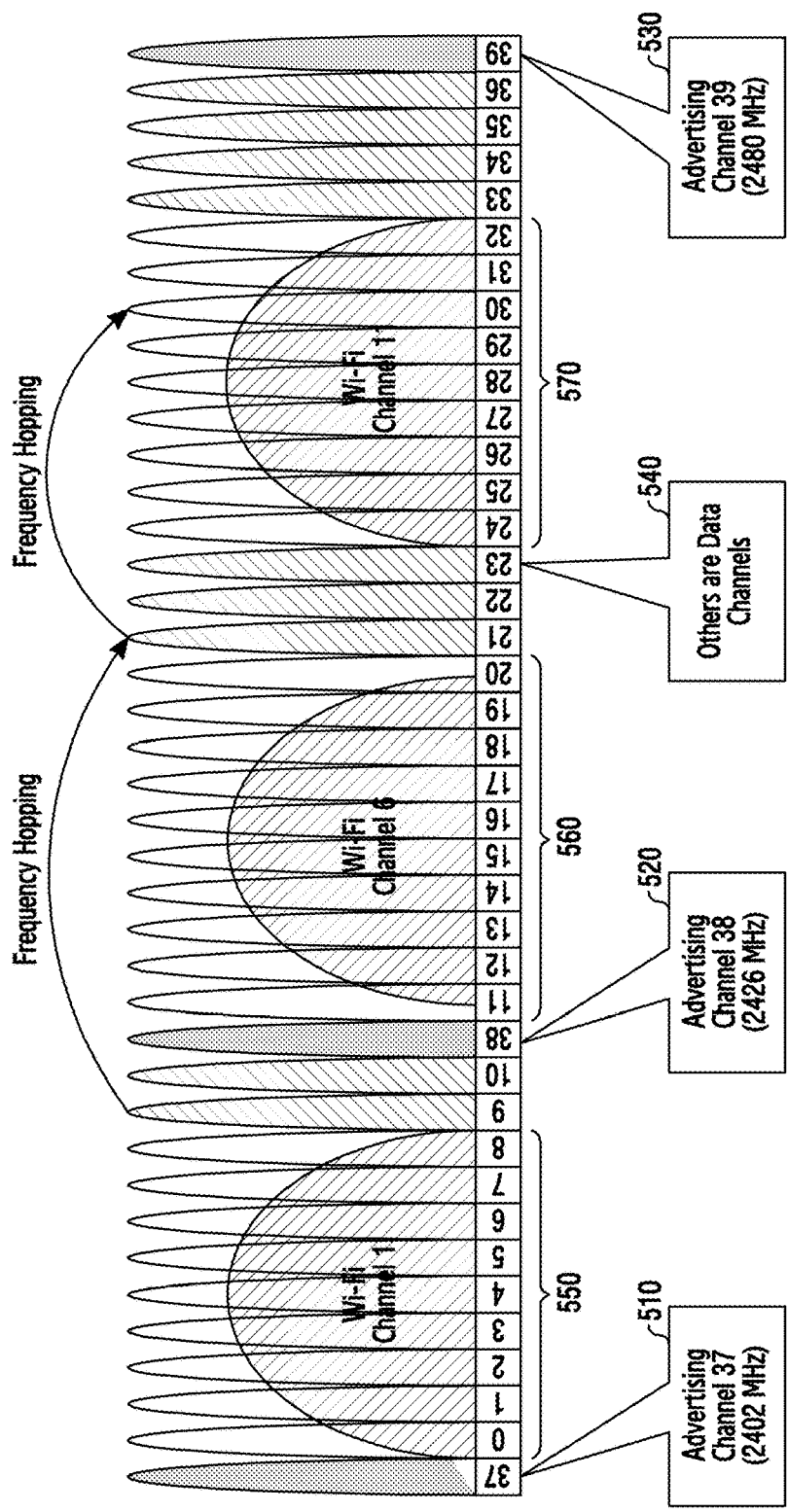

FIGS. 4 and 5 illustrate operations of an electronic device in a system according to embodiments of the present disclosure.

As illustrated in FIG. 4, a system according to embodiments of the present disclosure may be configured by including various types of beacon devices 410 and 415, a network system 420, a user equipment (UE) 430, and a wireless communication device 460, for example. For ease of description, in association with the beacon devices 410 and 415, a beacon device used for describing the operations of the present disclosure may be referred to as a signage (or IoT device) 410, and a beacon device existing around the signage 410 is referred to as the beacon 415.

Referring to FIG. 4, FIG. 4 illustrates the situation in which beacon devices, such as the beacon 415 and the signage 410, are deployed to be dispersed in a real network.

The beacon 415 may perform the function of a transmitter, and may further perform the function of a receiver.

The signage 410 may be embodied as one of the various beacon devices and various IoT devices. According to embodiments of the present disclosure, the signage 410 may receive predetermined data, such as an advertisement and product price information, from the network system 420. The signage 410 may update existing data based on the received data, and may output (display) the received data through a display based on the result of updating.

The UE 430 may be connected to the network system 420 (e.g., a base station 427), and may receive data, such as a frame and/or a packet of at least one of WiFi, BT, and BLE, transmitted by the beacon 415 and the signage 410. When the data is received from the beacon 415 or the signage 410, the UE 430 may drive an application corresponding to the received data.

The network system 420 may include a server 423 (e.g., a service server) for supporting an application service, and may include a server 421 (e.g., management server, a provider server) for managing the signage 410. The management server 421 may transmit predetermined data, such as advertisements, coupons, product price information, and application information based on the recognition of an approaching user, and may manage displaying the predetermined data through the display of the signage 410 and updating the same.

The data (or information) managed through the management server 421 may include an installation region of the signage 410, a location, detailed information, a battery state, a screen state, the intensity of a signal in association with the base station 427, information associated with the connected signage 410, such as a device identifier (ID), and information associated with a radio wave signal, such as an allocated channel index, and an advertise packet interval. In the embodiment of FIG. 4, when the signage 410 determines an optimal radio channel based on the signals, such as radio wave signal information, of adjacent beacons 410 and 415 and other wireless communication devices, the network system 420 receives the same, and acts as a medium that transfers the same to the UE 430 in the region where the signage 410 is installed.

The wireless communication device 460 may include an access point (AP), and may provide a wireless communication service, such as WiFi, to the UE 430.

In the system as illustrated in FIG. 4, the signage 410 may fixedly use a channel 440 that broadcasts an advertising packet and a broadcasting period, generally. The frequency that the signage 410 uses may overlap the frequency of a device (e.g., the wireless communication device 460(465)) that has a strong transmission power from among various adjacent devices, such as the beacon 415, the wireless communication device 460, and the UE 430. In this instance, the signage 410 have difficulty in avoiding interference from an adjacent device since the signage 410 fixedly uses the channel, and may have difficulty in efficiently performing data transmission to the UE 430 and discovery of the UE 430.

For example, referring to FIGS. 4 and 5, the beacons 415 and 410 may comply with the contactless-based BLE standard (spec), as illustrated in FIG. 5. For example, the beacons 415 and 410 may use a $37^{th}$ channel 510, a $38^{th}$ channel 520, and a $39^{th}$ channel 530 in a physical channel band of 2.4 GHz. The wireless communication device 460 existing around the beacons 415 and 410 uses 13 channels having the 20 MHz bandwidth at intervals of 5 MHz in the physical channel of 2.4 GHz. The wireless communication device 460 may select at least one out of 13 channels and uses the same, and may determine at least one out of a $1^{st}$ channel (WiFi channel 1) 550, a $6^{th}$ channel (WiFi channel 6) 560, and an $11^{th}$ channel (WiFi channel 11) 570, and may use the same.

The wireless communication device 460 may use a channel, such as a $5^{th}$ channel and a $13^{th}$ channel, other than the $1^{st}$ channel (WiFi channel 1) 550, the $6^{th}$ channel (WiFi channel 6) 560, and the $11^{th}$ channel (WiFi channel 11) 570, which exist around the channels used by the beacon 415 and 410. In this instance, the channel used by the beacon 415 and 410 and the channel used by the wireless communication device 460 may overlap. Accordingly, from the perspective of the beacons 415 and 410 that have a relatively weak transmit power, a channel interference may rapidly increase. In an environment where various types of beacons 415 and 410 and the wireless communication device 460 coexist, the UE 430 may continuously receive a large number of beacon signals or wireless communication signals from the beacons 415 and 410 and the wireless communication device 460. Accordingly, the amount of battery power consumed may be increased.

The deterioration of discovery of a UE due to the interference caused since the beacons and the wireless communication devices use an identical band or adjacent bands, such as overlap of used channels, and a method of reducing the amount of battery power consumed by the UE will be disclosed.

The signage 410 may interwork with the network system 420. For example, the network system 420 may include a cellular-based provider server, a server that manages the beacon 415 or the signage 410, and an application server that supports a service. The signage 410 may interwork with the network system 420 based on wired communication or wireless communication.

The signage 410 may proceed with a scanning process with respect to a WiFi, ZigBee, or BT (BLE) channel in various frequency bands, such as 2.4 GHz, 5 GHz, 28 GHz, or the like. For example, the signage 410 may proceed with scanning in 2.4 GHz. The signage 410 may execute full scanning with respect to the full frequency band, and may generate channel information by measuring and calculating interference, RSSI, CINR, SINR, or C/I through the scanning process. As described above, the signage 410 may select and determine a radio link and a channel that enables communication between the signage 410 and the UE 430, based on channel information measured and collected by scanning the unlicensed band, such as bands used by WiFi, ZigBee, or BT.

The radio link and the channel information determined by the signage 410 may be transmitted to the network system 420 (e.g., the provider server 421 for managing the signage 410) that manages the corresponding signage 410. For example, the provider server 421 that is installed by the provider may store a radio link, channel (advertising channel received from a WiFi or BT module) information, together with a device ID, and may transmit the same to the UE 430 existing in a cell.

When the preference and rejection of a service in association with a user is set in advance in the UE 430, the UE 430 may correct (update) predetermined information, such as user's service preference and rejection setting information, based on the information transmitted from a server, and may filter a beacon device (particularly, a signage for receiving a service). For example, the UE 430 may select, based on at least some of the received information, a predetermined beacon, such as the signage 410, for using a service out of various beacons 415 and the wireless communication device 460 existing nearby.

The UE 430 may store, in an embedded memory, a white list for a preferred and rejected service. The white list may be received from a predetermined server of the network system 420, and may be stored in the embedded memory. The UE 430 may further include decoding an address (e.g., 48 bits address) of a preferred device (e.g., the signage 410) based on the white list stored in the embedded memory. The UE 430 may perform a filtering process based on the information (e.g., the white list) transferred through the provider server 421.

The present disclosure, the signage 410 may determine the degree of congestion of the adjacent wireless communication channels, such as the $1^{st}$ channel 550, the $6^{th}$ channel 560, and the $11^{th}$ channel 570 based on WiFi, based on the result of scanning. As a contactless-based initial access channel (e.g., a channel of a BT (or BLE)) through which the signage 410 is capable of communicating with another BLE device, such as the UE 430, the $37^{th}$ channel 510, the $38^{th}$ channel 520, and the $39^{th}$ channel 530 may be appropriate. However, when the $1^{st}$ channel 550, the $6^{th}$ channel 560, and the $11^{th}$ channel 570 are congested in WiFi, the performance of the $38^{th}$ channel 520 and the $39^{th}$ channel 530 of the BT (BLE) may significantly deteriorate. When the $37^{th}$ channel 510 through which communication is possible becomes significantly congested, its performance may not also be secured.

The degree of congestion may be reduced by changing an advertising channel index, such as a frequency. For example, the signage 410 may determine to not temporarily broadcast an advertising packet in the $38^{th}$ channel 520 and the $39^{th}$ channel 530. The signage 410 may determine, as a substitute channel from among other channels, a predetermined frequency band, such as data channel 450, that is capable of transmitting a general BT/BLE data packet although it is not set for the purpose of broadcasting an advertising packet.

The signage 410 may change the $38^{th}$ channel 520 and the $39^{th}$ channel 530 with a $15^{th}$ channel and a $29^{th}$ channel, or may add the $15^{th}$ channel and the $29^{th}$ channel. The changed channel information (or frequency information) (e.g., the $15^{th}$ channel and $29^{th}$ channel) may be transmitted to the network system 420 (e.g., the provider server 421) wirelessly or by wire, and may be transmitted by the provider server 421 to UEs (e.g., the UE 430) existing in a region where the signage 410 is installed (geographically located). The signage 410 may broadcast an advertising packet to a channel (e.g., the $15^{th}$ channel and the $29^{th}$ channel) corresponding to the changed channel information.

The UE 430 that receives the message from the network system 420 may receive the advertising packet of the signage 410 based on the changed channel information (e.g., the $15^{th}$ channel and the $29^{th}$ channel). According to embodiments of the present disclosure, the $15^{th}$ channel and the $29^{th}$ channel may be added to an adjacent channel and may make an extension.

The signage 410 may broadcast only the changed channel information (e.g., the $15^{th}$ channel and the $29^{th}$ channel) by minimizing a packet data unit (PDU) of a packet in the $38^{th}$ channel 520 and the $39^{th}$ channel 530. The length of the packet may be minimized, and thus, the reception rate may be increased. The UE 430 that receives the packet may receive the advertising packet through the $15^{th}$ channel and the $29^{th}$ channel, without passing the network system 420.

The signage 410 may fixedly use only a predetermined channel, such as the $37^{th}$ channel 510, having a low degree of congestion, as opposed to using congested other channels, such as the $38^{th}$ channel 520 and the $39^{th}$ channel 530.

Figure 6:
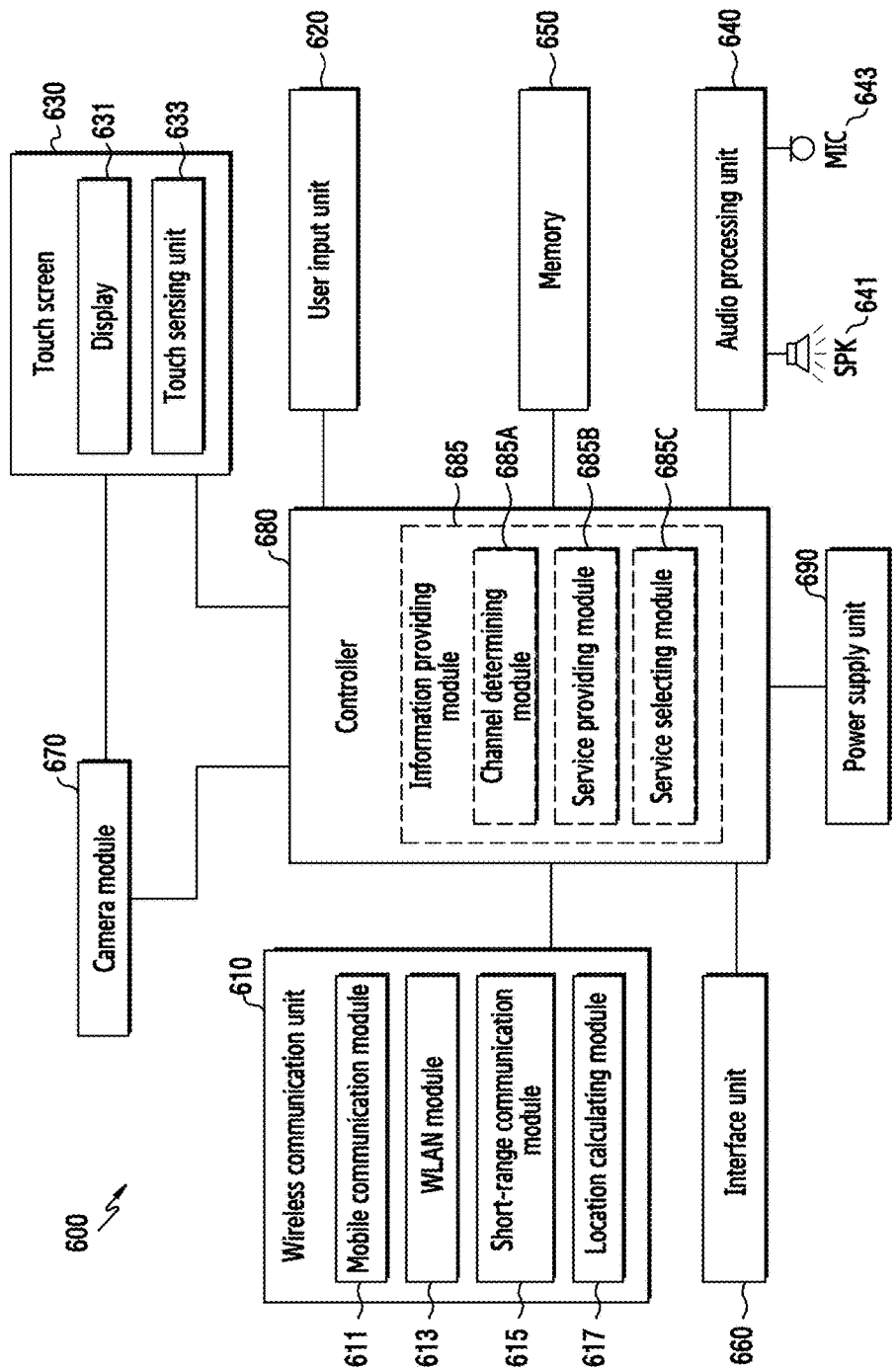
FIGS. 6 and 7 illustrate a configuration of an electronic device according to embodiments of the present disclosure.

FIG. 6 is a block diagram schematically illustrating a configuration of an electronic device according to embodiments of the present disclosure.

FIG. 6 illustrates the case in which an electronic device is a UE, such as the UE 430, according to embodiments of the present disclosure. An electronic device 600 may include a wireless communication unit 610, a user input unit 620, a touch screen 630, an audio processing unit 640, a memory 650, an interface unit 660, a camera module 670, a controller 680 (e.g., the processor 120), and a power supply unit 690. The electronic device 600 may include fewer or more components when compared to the components of FIG. 6, since the components of FIG. 6 are not essential.

The wireless communication unit 610 may include a configuration that is identical or similar to the communication module 220 of FIG. 2. The wireless communication unit 610 may include one or more modules that enable wireless communication between the electronic device 600 and another external electronic device, such as a signage, a beacon, and a server. For example, the wireless communication unit 610 may be configured to include a mobile communication module 611, a wireless local area network (WLAN) module 613, a short-range communication module 615, a location calculating module 617, and the like. According to embodiments of the present disclosure, the wireless communication unit 610 may include a module, such as a short-range or long-range communication module, for performing communication with an external electronic device existing nearby. The mobile communication unit 611 may include a configuration that is identical or similar to the cellular module 221 of FIG. 2. The mobile communication module 611 may transmit/receive a wireless signal to/from at least one of a base station, an external electronic device, and various servers (e.g., an application server, a management server, an integration server, a provider server, a content server, an Internet server, a cloud server, or the like) over a mobile communication network. The wireless signal may include a voice signal, a data signal, or various types of control signals. The mobile communication module 611 may transmit various pieces of data required to the operations of the electronic device 600 to the external electronic device, in response to a user's request.

The wireless LAN (WLAN) module 613 may include a configuration that is identical or similar to the WIFI module 223 of FIG. 2. The WLAN module 613 may indicate a module for establishing a wireless Internet access and a wireless LAN link with another electronic device. The WLAN module 613 may be mounted inside or outside the electronic device 600. Wireless Internet technologies may include Wi-Fi, wireless broadband (Wibro), world interoperability for microwave access (WiMax), high speed downlink packet access (HSDPA), millimeter wave (mmWave), or the like. The WLAN module 613 may interwork with another external electronic device that is connected with the electronic device 600 through the network, and may transmit various data of the electronic device 600 to the outside, such as an external electronic device or server, or may receive various data from the outside. The WLAN module 613 may always maintain an on-state, or may be turned on based on settings of the electronic device 600 or a user input.

The short-range communication module 615 may be a module for performing short-range communication. Short-range communication technologies may include Bluetooth™, Bluetooth low energy (BLE), radio frequency identification (RFID), infrared data association (IrDA), ultra wideband (UWB), ZigBee™, near field communication (NFC), for example. The short-range communication module 615 may interwork with another external electronic device, such as a signage and a beacon) that is connected with the electronic device 600 over a network, and may transmit or receive various data of the electronic device 600 to/from the external electronic device. The short-range communication module 615 may always maintain an on-state, or may be turned on based on settings of the electronic device 600 or a user input.

The location calculating module 617 may include a configuration identical or similar to the GNSS module 227 of FIG. 2. The location calculation module 617 may be a module for obtaining the location of the electronic device 600, and may include a global positioning system (GPS) module as a representative example. The location calculation module 617 may measure the location of the electronic device 600 through a triangulation principle.

The user input unit 620 may generate input data for controlling the operation of the electronic device 600 in response to a user input. The user input unit 620 may include at least one input device for detecting various inputs of a user. For example, the user input unit 620 may include a keypad, a dome switch, a physical button, a touch pad (resistive type/capacitive type), a jog & shuttle, and a sensor.

The user input unit 620 may be embodied in the form of buttons located outside the electronic device 600, or some or all of the user input unit 620 may be embodied as a touch panel. The user input unit 620 may receive a user input for initiating the operations, such as a beacon-based service reception function of the electronic device 600 according to embodiments of the present disclosure, and may generate an input signal based on the user input.

The touch screen 630 may be an input/output device that simultaneously executes an input function and a display function, and may include a display 631dsand a touch sensing unit 633. The touch screen 630 may provide an input/output interface between the electronic device 600 and a user, may transfer a touch input of the user to the electronic device 600, and may serve as a medium that shows an output from the electronic device 600 to the user. The touch screen 630 may show a visual output to the user. The visual output may be shown in the form of text, graphics, video, or a combination thereof.

The display 631 may display (output) various pieces of information processed in the electronic device 600. For example, the display unit 631 may display a User Interface (UI) or graphic UI (GUI) associated with an operation in which the electronic device 600 executes a beacon-based service. The display 631 may use various displays, and a bended display may be used as the display 631.

The touch sensing unit 633 may be mounted on the display 631, and may sense a user input that is in contact with, or in proximity to, the surface of the touch screen 630. The user input may include a touch event or a proximity event that is input based on at least one of a single-touch, a multi-touch, hovering, and an air gesture. The touch sensing unit 633 may receive a user input for initiating the operations associated with using the electronic device 600 according to embodiments of the present disclosure, and may generate an input signal based on the user input.

The audio processing unit 640 may include a configuration identical or similar to the audio module 280 of FIG. 2. The audio processing unit 640 may transmit an audio signal received from the controller 680 to a speaker (SPK) 641, and may transfer, to the controller 680, an audio signal, such as a voice or the like, which is input from a microphone 643. The audio processing unit 640 may convert voice/sound data into audible sound through the speaker 641 based on the control of the controller 680 and may output the audible sound, and may convert an audio signal, such as a voice or the like, which is received from the microphone 643 into a digital signal and may transfer the digital signal to the controller 680.

The speaker 641 may output audio data that is received from the wireless communication unit 610 or stored in the memory 650. The speaker 641 may output a sound signal associated with various operations (functions) executed by the electronic device 600.

The microphone 643 may receive an external sound signal, and may process the same to be electrical voice data. Various noise reduction algorithms may be implemented in the microphone 643 to remove noise generated in the process of receiving an external sound signal. The microphone 643 may be in charge of inputting an audio stream such as a voice command, such as a voice command for initiating a beacon-based service and a voice command for initiating data communication.

The memory 650 may store one or more programs that are executed by the controller 680, and may execute a function for temporarily storing input/output data. The input/output data may include files (such as videos, images, pictures and audio, and frequency information (or channel information). The memory 650 may be in charge of storing obtained data. The memory 650 may store data, which is obtained in real time, in a temporary storage device, and may store data, which is determined to be stored, in a storage device that is capable of keeping the data for a long time.

The memory 650 may perform filtering a beacon, such as a signage for receiving a service, such as an advertising packet) based on at least one signal, such as channel and control information received from an external device, receiving a service by changing, based on the received signal, a channel to a channel that is capable of receiving a service through the beacon, and storing one or more programs, data, or instructions that are associated with executing an application corresponding to the received service. The memory 650 may perform changing a scan period with respect to a channel corresponding to channel information; and storing one or more programs, data, or instructions that are associated with receiving a signal broadcasted from an external device using the changed scan period.

The memory 650 may include one or more application modules (or software modules) or the like.

The interface unit 660 may have a configuration that is identical or similar to the interface 270 of FIG. 2. The interface unit 660 may receive data or power from an external electronic device, and may transfer the same to each component included in the electronic device 600. The interface unit 660 may enable the data inside the electronic device 600 to be transmitted to the external electronic device. For example, the interface unit 660 may include a wired/wireless headphone port, an external charger port, a wired/wireless data port, a memory card port, an audio input/output port, a video input/output port, an earphone port, and the like.

The camera module 670, such as the camera module 291) may indicate a configuration that supports a photographing function of the electronic device 600. The camera module 670 may photograph a subject under the control of the controller 680, and may transfer the photographed data, such as an image) to the display 631 and the controller 680.

The controller 680 may control the general operations of the electronic device 600. According to embodiments of the present disclosure, the controller 680 may have a configuration that is identical or similar to that of the processor 210 of FIG. 2. The controller 680 may process filtering a beacon, such as a signage) for receiving a service, such as an advertising packet) based on at least one signal, such as channel information and control information) received from an external device, receiving a service by changing, based on the received signal, a channel to a channel that is capable of receiving a service through the beacon, and executing an application corresponding to the received service. The controller 680 may process changing a scan period with respect to a channel corresponding to channel information, and receiving a signal broadcasted from the external device using the changed scan period.

The controller 680 may include one or more processors for controlling the operations of the electronic device 600. The controller 680 may control the operations of a hardware module, such as the audio processing unit 640, the interface unit 660, and the display 631. The operations of the controller 680 will be described with reference to the following drawings.

The controller 680 may be embodied as one or more processors that control the operations of the electronic device 600, by executing one or more programs stored in the memory 650.

The present disclosure, the controller 680 may include an information providing module 685 which may include a channel determining module 685A, a service providing module 685B, and a service selecting module 685C, for example.

The present disclosure, the channel determining module 685A may determine a channel for receiving a service, such as an advertising packet, based on data, such as channel information and control information, including at least one signal received from an external device. The channel determining module 685A may change a scan period with respect to the channel based on the received data.

The service providing module 685B may be configured by including an advertising content module, a coupon module, a special event module, a user information managing module, and the like. The service providing module 685B may receive a service through a channel determined through the channel determining module 685A, and may execute an application corresponding to the received service. The service providing module 685B may receive a signal from an external device based on a scan period changed by the channel determining module 685A.

The service selecting module 685C may select, from among a plurality of services, a specific service, based on a user's selection or a type of electronic device of the electronic device 600.

The power supply unit 690 may receive external power or internal power under the control of the controller 680, and may supply power required for the operation of each component. The power supply unit 690 may turn on/off supplying power to the display unit 631, the camera module 670, and the like, under the control of the controller 680.

As described above, an electronic device may include a wireless communication module, and a processor that is functionally connected with the wireless communication module. The processor may be configured to perform receiving channel information to be used for an external device, changing a (scan) period with respect to a channel corresponding to the channel information, based on at least the reception, and receiving a signal broadcasted from the external device based on the changed (scan) period.

The processor may be configured to increase the frequency of scanning the channel or to change a (scan) pattern.

Figure 7:
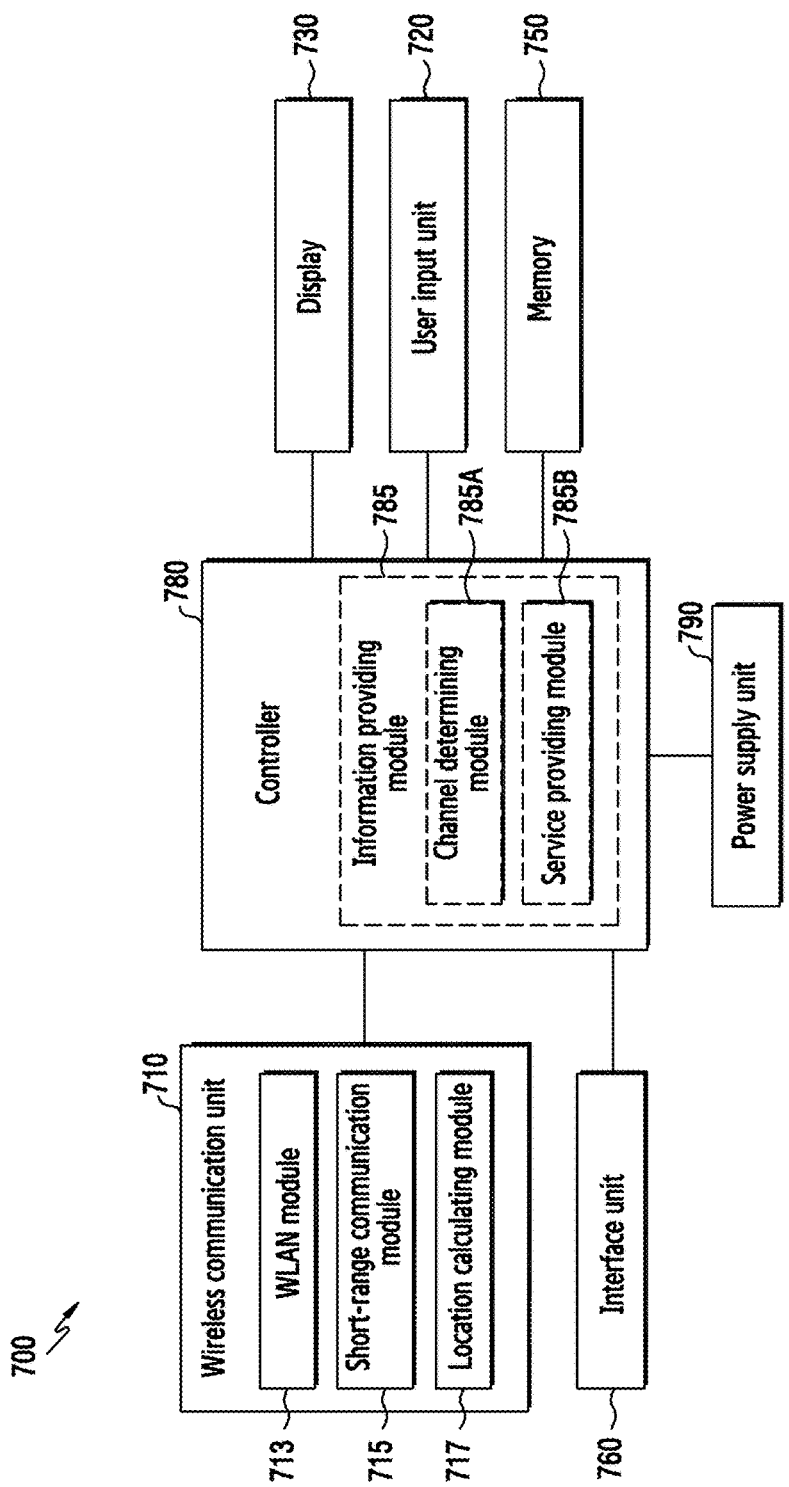

FIG. 7 is a block diagram schematically illustrating a configuration of an electronic device according to embodiments of the present disclosure.

FIG. 7 illustrates the case in which the electronic device is a signage, according to embodiments of the present disclosure. The signage provides an advertisement associated with a company that installs the signage, and operates to drive an application of a UE, such as the electronic device 600 of FIG. 6) for additional interaction with a user. The signage may use the BLE technology as a method of informing adjacent devices of the existence or the category of a service provided by an electronic device 700.

The electronic device 700, according to embodiments of the present disclosure, may be configured by including a wireless communication unit 710, a user input unit 720, a display 730, a memory 750, an interface unit 760, a controller 780, a power supply unit 790, and the like, and the electronic device 700 may have a configuration that is identical or similar to that of the electronic device 600 of FIG. 6. The electronic device 700 may include fewer or more components when compared to the components of FIG. 7, since the components of FIG. 7 are not essential.

The wireless communication unit 710 may include a configuration that is identical or similar to the communication module 220 of FIG. 2. The wireless communication unit 710 may include one or more modules that enable wireless communication between the electronic device 700 and another external electronic device, such as a UE and a provider server. For example, the wireless communication unit 710 may be configured by including a wireless LAN (WLAN) module 713, a short-range communication module 715, and a location calculating module 717, and may further include a communication module corresponding to the mobile communication module 611 of FIG. 6. The wireless communication unit 710 may include a module, such as a short-range or a long-range communication module, for performing communication with an external electronic device existing nearby. The wireless communication unit 710 may be configured by including the WLAN module 713, the short-range communication module 715, the location calculating module 717, and the like. The configuration of the wireless communication unit 710 may correspond to the configuration of the wireless communication unit 610 which has been described with reference to FIG. 6, and the detailed descriptions thereof will be omitted.

The user input unit 720 may generate input data for controlling the operations of the electronic device 700 in response to a user input. The configuration of the user input unit 720 may correspond to the configuration of the user input unit 620 which has been described with reference to FIG. 6, and the detailed descriptions thereof will be omitted.

The display 730 may display (output) various information processed in the electronic device 700, or various information, such as an advertisement or product price information, received from an external electronic device (e.g., a provider server). The configuration of the display unit 730 may correspond to the configuration of the display 631, which has been described with reference to FIG. 6, and the detailed descriptions thereof will be omitted. The electronic device 700 may be configured by including a touch screen that includes the display 730, such as the touch screen 630 of FIG. 6.

The memory 750 may store one or more programs that are executed by the controller 780, and may execute a function for temporarily storing input/output data. The input/output data may include files (such as videos, images, pictures, and audio), channel information, and service information, such as an advertisement and product price information. The memory 750 may be in charge of storing obtained data. The memory 750 may store data, which is obtained in real time, in a temporary storage device, and may store data, which is determined to be stored, in a storage device that is capable of keep the data for a long time.

The memory 750 may store one or more programs, data, or instructions that are associated with operations as follows: obtaining a signal from at least one external device through the short-range communication module 715; determining the intensity of a signal or a channel based on the signal; determining at least one channel from among a plurality of channels that are capable of performing communication, based on at least some of the intensity of the signal or the channel; and transmitting a broadcasting signal using the at least one channel. The memory 750 may store one or more programs, data, or instructions that are associated with operations for transmitting, to a first external device (e.g., a provider server) an indication of using the at least one determined channel, and transmitting, by the first external device to a second external device (e.g., a UE) an indication of using the at least one channel. The memory 750 may store one or more programs, data, or instructions that are associated with selecting a channel that has a minimized interference out of a plurality of channels as the at least one channel. The memory 750 may include one or more application modules (or software modules) for example.

The interface unit 760 may have a configuration that is identical or similar to the interface 270 of FIG. 2. The interface unit 760 may receive data or power from another external electronic device, and may transfer the same to each component included in the electronic device 700. The interface unit 760 may enable the data inside the electronic device 700 to be transmitted to another external electronic device. The configuration of the interface unit 760 may correspond to the configuration of the interface unit 660, which has been described with reference to FIG. 6.

The controller 780 may control the general operations of the electronic device 700. According to embodiments of the present disclosure, the controller 780 may have a configuration that is identical or similar to that of the processor 210 of FIG. 2. The controller 780 obtains a signal from at least one external device through the short-range communication module 715, determines the intensity of a signal or a channel based on the obtained signal, determines at least one channel from among a plurality of channels that are capable of performing communication based on at least some of the intensity of the signal or the channel, and transmits a broadcasting signal using the at least one channel. The controller 780 further transmits, to a first external device, an indication of using the at least one determined channel, and transmits, by the first external device to a second external device, an indication of using the at least one channel. The controller 780 selects a channel that has a minimized interference from among a plurality of channels as the at least one channel.

The controller 780 may include one or more processors for controlling the operations of the electronic device 700. The controller 780 may control the operations of a hardware module, such as the interface unit 760, and the display 730. The operations of the controller 780 will be described with reference to the following drawings.

The controller 780 may be embodied as one or more processors that control the operations of the electronic device 700, by executing one or more programs stored in the memory 750.

The controller 780 may include an information providing module 785. The information providing module 785 may include a channel determining module 785A, and a service providing module 785B.

The channel determining module 785A may obtain data including a signal from at least one external device through a communication module, such as the short-range communication module 715, and may determine the intensity of a signal or a channel based on the obtained data. The channel determining module 785A may determine at least one channel from among a plurality of channels that are capable of performing communication, based on at least some of the intensity of the signal or the channel. The channel determining module 785A may select a channel that has a minimized interference from among the plurality of channels as at least one channel.

The service providing module 785B may perform transmitting a broadcasting signal based on at least one channel determined through the channel determining module 785A. For example, the service providing module 785B may transmit an indication of using the at least one determined channel to a first external device, such as a provider server) or a second external device, such as a UE). The service providing module 785B may transmit an indication of using at least one channel to the first external device, such as a provider server), and may enable the first external device to transmit the indication to the second external device.

The power supply unit 790 may be provided with external power or internal power under the control of the controller 780, and may supply power required for the operation of each component. The power supply unit 790 may turn on/off supplying power to the display 730, and the like, under the control of the controller 780.

As described above, an electronic device, such as a signage), according to embodiments of the present disclosure, may include a wireless communication module that may support short-range wireless communication and a processor that is functionally connected with the wireless communication module. The processor is configured to perform obtaining a signal from at least one external device using the wireless communication module through the short-range wireless communication; determining at least one channel out of a plurality of channels based on at least some of a channel that obtains the signal or the intensity of the signal; and transmitting, to another external device, a broadcasting signal using the at least one channel.

The processor is configured to enable the electronic device to transmit an indication of using the at least one channel to another external device.

The other external device may be configured to transmit the indication received from the electronic device to a second external device. The other external device may include a server that manages displaying service information through the electronic device or a UE that approaches the electronic device within a designated distance.

The processor may be configured to select a channel that has a minimized interference from among a plurality of channels as the at least one channel. The processor may be configured to transmit the broadcasting signal to the other external device, so that the other external device performs discovery with respect to the electronic device using the broadcasting signal.

The processor may be configured to select target service information from among one or more pieces of service information, and to transmit, to the other external device, a request for executing an application corresponding to the target service information. The electronic device may further include a display, and the processor may be configured to receive, from a server, the one or more pieces of service information, and to display the target service information through the display.

The at least one external device may be configured to include a beacon device or an access point that exists with a designated distance range from the electronic device.

The processor may be configured to determine the degree of congestion based on the obtained signal; and to add/substitute at least one channel to/for an existing channel for transmitting the broadcasting signal based on the degree of congestion.

Embodiments described in the present disclosure may be implemented in a computer or a similar device-readable recording medium through software, hardware, or a combination thereof.

As described above, an electronic device may include a communication module configured to establish a connection with a first external device or a second external device; and a processor that is functionally connected with the communication module. The processor may be configured to perform receiving data including at least one signal from the first external device through the communication module; determining at least one channel out of a plurality of channels based on the data; and transmitting, to the first external device or the second external device, information associated with the at least one channel, so that the first external device transmits a broadcasting signal using the at least one channel.

The processor may be configured to perform transmitting the information to the first external device so as to change a channel for transmitting the broadcasting signal based on the at least one channel, and transmitting the information to the second external device in a region corresponding to the first external device so as to change a channel for receiving the broadcasting signal based on the at least one channel.

The electronic device may be configured to include a server that manages the first external device, and manages the first external device to display service information. The first external device may be configured to select target service information from among one or more pieces of service information provided by the server, and to transmit, to the second external device, a request for executing an application corresponding to the service information.

Figure 8:
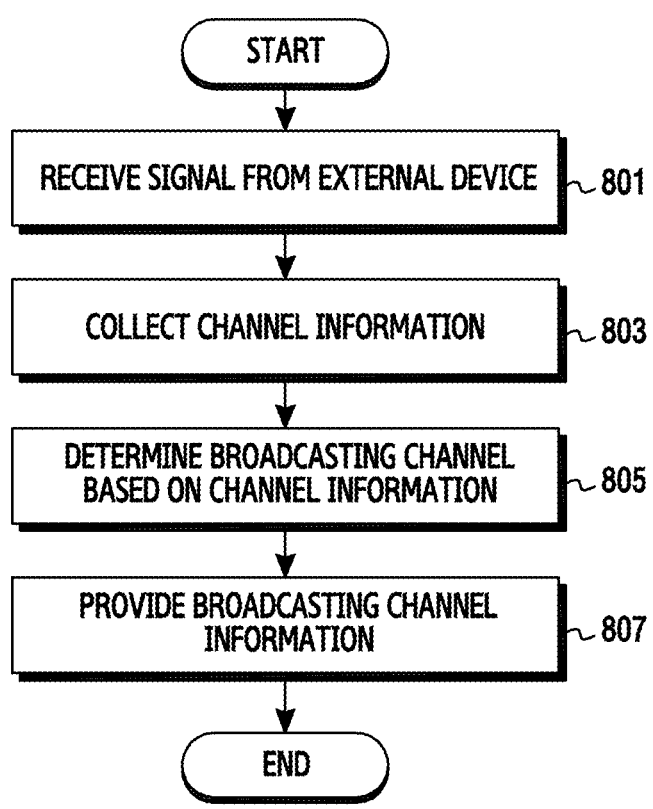
FIG. 8 illustrates an operation method of an electronic device according to embodiments of the present disclosure.

FIG. 8 illustrates an operation method of an electronic device according to embodiments of the present disclosure.

FIG. 8 assumes that an electronic device is a signage, and illustrates an operation in which the signage selects and determines a channel for an advertising packet based on an environment around the signage.

Referring to FIG. 8, in step 801, the electronic device, such as the controller 780 obtains a signal from at least one external device. For example, the controller 780 may receive signals transmitted by various beacons 415 and the wireless communication device 460, which exist around the signage 410, as described with reference to FIG. 4.

In step 803, the electronic device collects channel information from the received signal. For example, the controller 780 may collect channel information based on at least some of a channel that receives the signal or the intensity of the signal. The controller 780 may collect channel information of an unlicensed band. For example, the controller 780 may operate to perform channel scan measurement with respect to the full band. The controller 780 may proceed with a scanning process with respect to a WiFi, ZigBee, or BT (BLE) channel in various frequency bands, such as 900 MHz, 2.4 GHz, 5 GHz, 28 GHz, 32 HGz, or 60 GHz. The controller 780 may generate channel information by measuring and calculating Interference, RSSI, CINR, SINR, C/I, or the like, through the scanning process.

In step 805, the electronic device may determine a broadcasting channel (or advertising channel) for an advertising packet based on the channel information. According to embodiments of the present disclosure, the controller 780 may determine a broadcasting parameter, such as information associated with a radio link and a channel for broadcasting an advertising packet, based on the collected channel information. For example, the controller 780 may select and determine a radio link and a channel that enable the communication, such as advertising packet broadcasting, between the signage 410 and UE 430, based on the channel information collected through the scanning process with respect to the WiFi, ZigBee, WiGig, or BT (BLE) channel.

In step 805, the electronic device provides the determined broadcasting channel information. The radio link and the channel information determined by the controller 780 of the signage 410 may be transmitted to a corresponding server (e.g., a signage server, a management server, or a base station server) that manages the signage 410. When a signage server installed by a provider receives radio link and channel information from the signage 410, the signage server may store the received radio link and channel information by mapping them to device information, such as a device ID of the signage 410. The signage server may transmit the received broadcasting channel information to the UE 430 existing in a corresponding cell.

Figure 9:
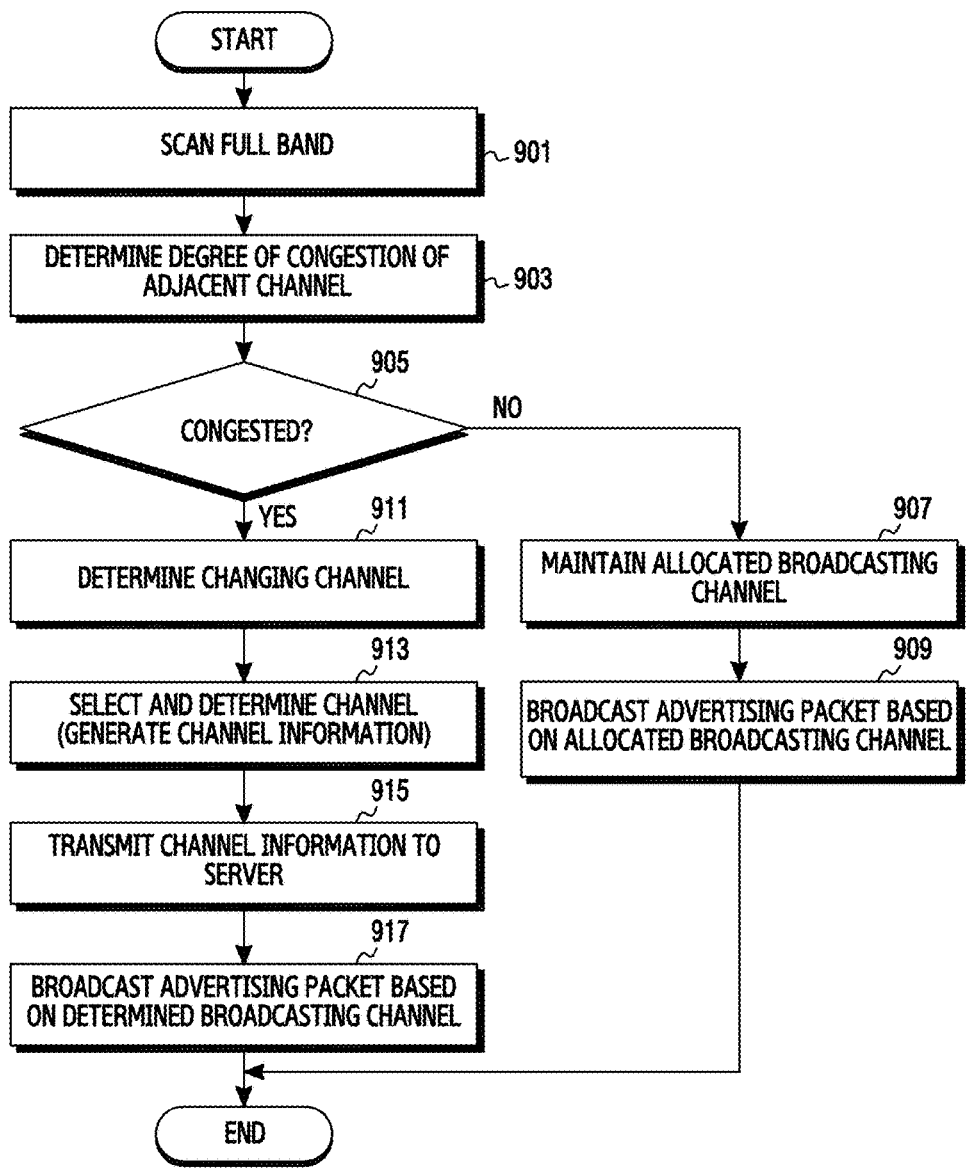
FIG. 9 illustrates an operation method of an electronic device according to embodiments of the present disclosure.

FIG. 9 illustrates an operation method of an electronic device according to embodiments of the present disclosure.

Referring to FIG. 9, in step 901, the electronic device scans the full band. For example, the controller 780 proceeds with a full scan process with respect to a WiFi, ZigBee, WiGig, or BT (BLE) channel, in the full band corresponding to various frequencies, such as 900 MHz, 2.4 GHz, 5 GHz, 28 GHz, 32 GHz, 60 GHz, or the like. The electronic device may scan the entirety of at least some band, such as 2.4 GHz~2.5 GHz supported by each wireless communication module.

The electronic device determines the degree of congestion of an adjacent channel based on the result of the scan in step 903, and determines whether congestion exists based on the result of determining the degree of congestion in step 905. For example, the controller 780 scans the full band as described above, and may determine the degree of congestion based on at least some of measurement and calculation associated with interference, RSSI, CINR, SINR, or C/I, through the scanning process.

When it is determined that the adjacent channel is not congested in step 905 (No in step 905), the electronic device maintains an allocated broadcasting channel in step 907, and broadcasts an advertising packet based on the allocated broadcasting channel in step 909.

When it is determined that the adjacent channel is congested in step 905 (Yes in step 905), the electronic device determines to change a channel (e.g., a broadcasting channel or an advertising channel) for broadcasting an advertising packet in step 911. When it is determined that the adjacent channel is congested, the controller 780 may determine to not temporarily broadcast an advertising packet in a channel, such as a $38^{th}$ channel and a $39^{th}$ channel that is currently used for broadcasting. The controller 780 may determine, as a substitute, a predetermined frequency band that is capable of transmitting BIBLE data packet, although it is not determined as a channel for broadcasting. The controller 780 may determine to change the $38^{th}$ channel and the $39^{th}$ channel with a $15^{th}$ channel and a $29^{th}$ channel.

In step 913, the electronic device selects and determines a channel for broadcasting an advertising packet, based on the determination of changing the channel. The controller 780 may generate channel information, such as radio link and channel, associated with the determined broadcasting channel. For example, based on the result of scanning the WiFi, ZigBee, WiGig, or BT (BLE) channel, the controller 780 may select a channel having the lowest degree of congestion based on the determined degree of congestion, and may determine the selected channel as a channel for broadcasting, through which a signage and a UE may perform communication. The controller 780 may generate channel information including a radio link and a channel index, which corresponds to the determined channel.

In step 915, the electronic device transmits, to a server, the channel information, such as an index corresponding to the $15^{th}$ channel and the $29^{th}$ channel, which is the changed channel information. The server may store channel information received from the signage, and may transmit the same to the UE.

In step 917, the electronic device broadcasts an advertising packet based on the determined broadcasting channel.

As described above, an operation method of an electronic device, may include obtaining a signal from at least one external device through short-range wireless communication using a wireless communication module, determining at least one channel out of a plurality of channels based on a channel that obtains the signal or the intensity of the signal, and transmitting a broadcasting signal to another external device using the at least one channel.

The operation of transmitting may include transmitting, by the electronic device, an indication of using the at least one channel to another external device. The other external device may further include transmitting the indication received from the electronic device to a second external device.

The other external device may be configured to include a server that manages displaying service information through the electronic device or a UE that approaches the electronic device within a designated distance.

The operation of determining may include selecting a channel that has a minimized interference from among a plurality of channels as the at least one channel. The other external device may further include transmitting the broadcasting signal to the other external device, so that the other external device performs discovery with respect to the electronic device using the broadcasting signal.

The electronic device may include selecting target service information from among one or more pieces of service information, and transmitting, to the other external device, a request for executing an application corresponding to the target service information. The electronic device may include receiving, from a server, the one or more pieces of service information, and displaying the target service information through the display.

The electronic device may include determining the degree of congestion based on the obtained signal, and adding/substituting at least one channel to/for an existing channel for transmitting the broadcasting signal based on the degree of congestion.

Figure 10:
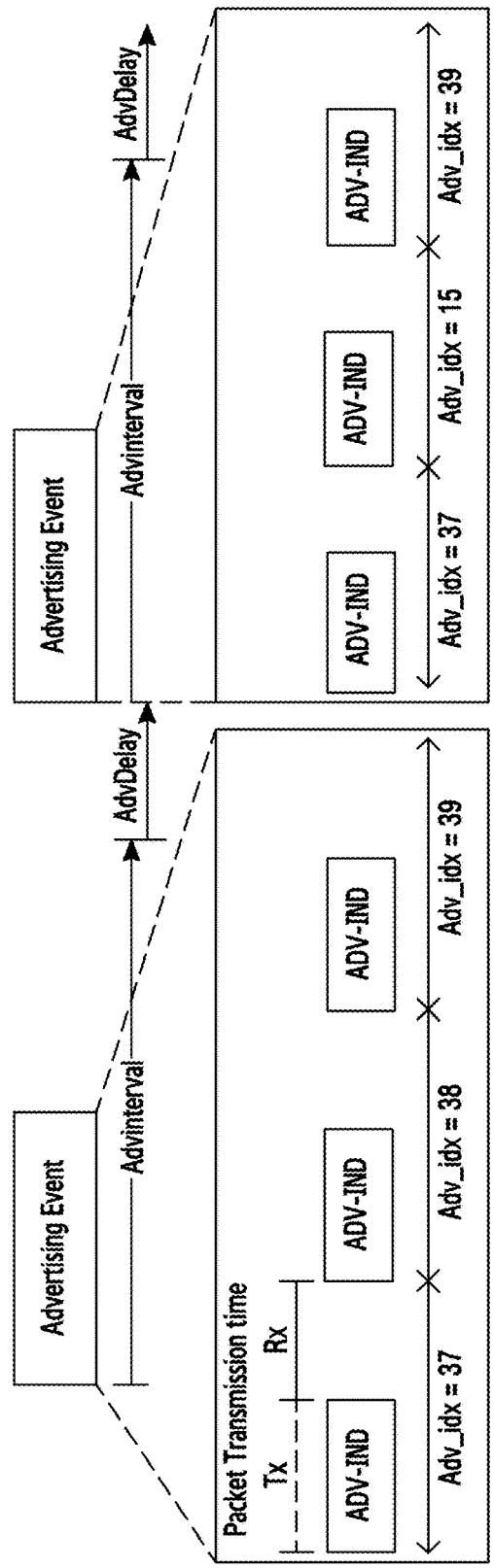
FIG. 10 illustrates an electronic device to change an advertising packet interval according to embodiments of the present disclosure.

FIG. 10 illustrates an electronic device to change an advertising packet interval according to embodiments of the present disclosure.

When it is determined that an adjacent wireless communication channel is congested based on the result of scanning, a signage may select and determine another channel that enables the communication between the signage and a UE. The controller 780 may change an advertising packet interval used for broadcasting an advertising packet. For example, the broadcasting period, time, or timer of an advertising packet may be set.

Referring to FIG. 10, in the case of BLE, generally, the advertising packet interval of a signage may maintain the time in the range of 20 ms to 10.24 s, as shown in Equation (1) as follows.

$$20\ ms \leq advInterval = N*0.625\ ms \leq 10.24\ s \quad (1)$$

The signage may transmit, via a server, a packet interval determined by the signage to a UE that exists in a corresponding region or to a UE that desires a service.

In the state in which a channel is changed (a $38^{th}$ channel and a $39^{th}$ channel are changed with a $15^{th}$ channel and a $29^{th}$ channel), a scan interval (scanInterval) and a scan window (scanWindow) may be calculated based on Equation (2) and Equation (3), as follows.

$$advInterval = (scanInterval*N - 1.5*scanWindow)/M - advDelay/2 (N,M:\text{natural integer}) \quad (2)$$

$$advInterval = (scanInterval*N + 1.5*scanWindow)/M - advDelay/2 (N,M:\text{natural integer}) \quad (3)$$

As described above, the information calculated by the signage may be transmitted to a server wirelessly or by wire, and may be transmitted, by the server, to UEs existing in the location (region) of the signage, in the form of a message.

A UE that receives the message may scan an advertising packet based on the changed channel information and a required reception period. As illustrated in FIG. 10 and Table 1 provided below, the period may be adjusted by adding the $15^{th}$ channel and the $29^{th}$ channel.

TABLE 1

|  | Advertising Channel | Advertising Interval | Advertising Delay | Scan Interval | Scan Window |
|---|---|---|---|---|---|
| Type A (default) | 37, 38, 39 | (Equation (1)) | 5 ms (0~10 ms) | 20 ms~10.24 s | 50 ms |
| Type B (proposed) | 37, 15, 29 | (Equation (2)) | 5 ms (0~10 ms) | 20 ms~10.24 s | 50 ms |

For example, a UE may optimize a scan interval (scanInterval) based on an advertising packet interval that is broadcasted in a predetermined region. When the scan interval is not optimized, and in the worst case, scanning needs to be performed continuously during approximately 11 seconds. The problem associated with the consumption of battery power of a UE becomes worse based on how many times the scanning is performed with how many devices. Therefore, the server may determine an advertising packet interval based on Table 1 or the embodiment of FIG. 10, and transmits a related parameter to a UE, as described in the following descriptions provided with reference to FIG. 11. Transmit/receive (Tx/Rx) Power, Interference, RSSI, CINR, SINR, and C/I may be additionally included, in addition to Table 1.

Figure 11:
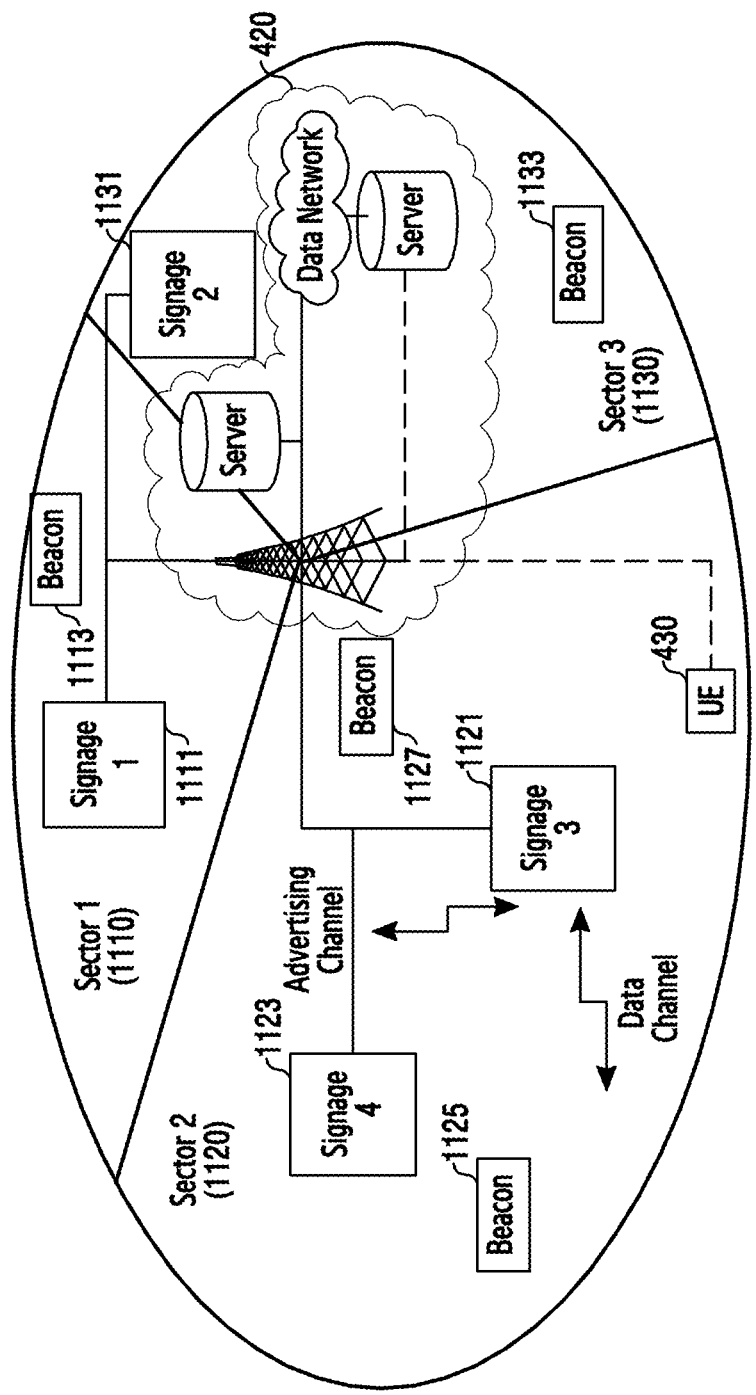
FIG. 11 illustrates operations of a server in a system according to embodiments of the present disclosure.

FIG. 11 illustrates operations of a server in a system according to embodiments of the present disclosure.

As described in FIG. 11, a system may have a configuration identical or similar to that of the system of FIG. 4. In the descriptions of FIG. 11, similar reference numerals may be used with respect to components that are similar to FIG. 4. For example, the system according to embodiments of the present disclosure may be configured by including various types of beacon devices 1111, 1113, 1121, 1123, 1125, 1127, 1131, and 1133, the network system 420, the UE 430, and the like. Although it is omitted in FIG. 11, a wireless communication device corresponding to FIG. 4 may be further included. In association with the beacon device 1111, 1113, 1121, 1123, 1125, 1127, 1131, and 1133, a beacon device used for describing the operations of the present disclosure is referred to as a signage, such as first signage 1111, second signage 1131, third signage 1121, and fourth signage 1123, and a beacon device existing around the signage 1111, 1131, 1121, and 1123 is referred to as a beacon, such as beacons 1113, 1125, 1127, and 1133.

FIG. 11 illustrates the situation in which beacon devices, such as a beacon and a signage, are deployed to be dispersed in a real network. According to embodiments of the present disclosure, the beacon devices deployed to be dispersed may be managed based on a geo-fence, such as a virtual boundary of a geographical location or a predetermined region formed based on a predetermined region, such as a cell unit or a sector unit in the network system 420 (e.g., a base station).

The beacon 1113, 1125, 1127, and 1133 may perform the function of a transmitter, and may additionally support the function of a receiver.

The signage 1111, 1131, 1121, and 1123 may be embodied as one of various beacon devices and various IoT devices. The signage 1111, 1131, 1121, and 1123 may receive predetermined data, such as an advertisement and product price information, from the network system 420. The signage 1111, 1131, 1121, and 1123 may update existing data based on the received data, and may output (display) the received data through a display based on the result of updating.

The UE 430 is connected with the network system 420 and may receive data transmitted by the beacons 1113, 1125, 1127, and 1133 and the signage 1111, 1131, 1121, and 1123, and may drive an application associated with the UE 430.

The network system 420 (e.g., a server) may include a service server for supporting an application service, and a server for managing the signage 1111, 1131, 1121, and 1123. The management may include updating an advertisement or product price information that may be displayed, and displaying the same in a display, through the signage 1111, 1131, 1121, and 1123. The information managed through the network system 420 may include an installation region of the signage 1111, 1131, 1121, and 1123, a location, detailed information, a battery state, a screen state, the intensity of a signal in association with a base station, information associated with the connected signage 1111, 1131, 1121, and 1123, such as a device ID, information associated with a radio wave signal, such as an allocated channel index, and an advertise packet interval.

In the embodiment described with reference to FIG. 4, it is described that the network system 420 (e.g., a server) acts as a medium for transferring an optimal radio channel to the UE 430, after the signage 1111, 1131, 1121, and 1123 determines the optimal radio channel based on the radio wave signal information of adjacent beacons 1113, 1125, 1127, and 1133 and another device (e.g., a wireless communication device). In the embodiment described with reference to FIG. 11, based on information to be transferred to the UE 430, the network system 420 (e.g., a server) may directly determine and adjust a region(location)-based advertising channel index.

For example, referring to FIG. 11, the signage 1111, 1131, 1121, and 1123 may interwork with a cellular-based server, and may proceed with a channel scanning process, such as WiFi, ZigBee, WiGig, BT(BLE), or the like, in various frequency bands (e.g., 2.4 GHz, 5 GHz, 28 GHz, or the like). The signage 1111, 1131, 1121, and 1123 may measure and calculate Interference, received signal strength indicator (RSSI), carrier to interference and noise ratio (CINR), signal to interference and noise ratio (SINR), and C/I, through a scanning process, may generate related channel information, and may transmit the same to the network system 420.

The network system 420 may adjust and determine advertising-related information based on a time, a frequency, or a region, based on the data (e.g., channel information) received from the signage 1111, 1131, 1121, and 1123. The network system 420 may transfer the determined advertising-related information to a UE and a signage existing in a corresponding region at a corresponding time in the form of a message, or may transfer the same to an application in the form of a push notification. When the UE and the signage receives the message (or push notification) of the network system 420, the UE and the signage may change an advertising channel index, an advertising packet interval, and the like in a framework, based on the message. The UE and the signage may perform a scanning and discovery process based on the changed advertising channel index and advertising packet interval.

Referring to FIG. 11, the signage 1111, 1131, 1121, and 1123 may be capable of scanning the 2.4 GHz band of an adjacent WiFi/BT/BLE device in any time. The signage 1111, 1131, 1121, and 1123 may transmit the result data (e.g., channel information) to the network system 420. The network system 420 may analyze the degree of congestion of a WiFi channel based on the region of a corresponding signage, based on the result data, such as the result of scanning and channel information, received from the signage 1111, 1131, 1121, and 1123.

The network system 420 may determine that the WiFi channel (e.g., a $1^{th}$ channel, a $6^{th}$ channel, and an $11^{th}$ channel) is congested in a first sector 1110. In this instance, the network system 420 may determine that a $37^{th}$ channel, a $38^{th}$ channel, and a $39^{th}$ channel are appropriate for a contactless (such as a BT(BLE) device)-based initial access channel, in the region of the first sector 1110, and may not separately transfer a control command message to a signage of the corresponding sector, such as the first signage 1111 of the first sector 1110.

The network system 420 may determine that a WiFi channel, such as a $4^{th}$ channel, a $9^{th}$ channel, and a $14^{th}$ channel is congested in a second sector 1120, based on the reported result value. In this instance, the network system 420 may expect that the performance of the $38^{th}$ channel and the $39^{th}$ channel out of the contactless (such as a BT(BLE) device)-based initial access channels significantly deteriorates. In the case of the $37^{th}$ channel that is available out of the initial access channels, the performance of the $37^{th}$ channel may also not be secured due to many adjacent BT(BLE) devices.

Therefore, the network system 420 may determine to not temporarily broadcast an advertising packet to a signage, such as the third signage 1121 existing in the second sector 1120, in the $38^{th}$ channel and the $39^{th}$ channel. The network system 420 may determine, as a substitute, a predetermined frequency band that is capable of transmitting a general BT/BLE data packet, although it is not set for the purpose of broadcasting.

The network system 420 may transfer a control command to a corresponding signage, such as the third signage 1121 of the second sector 1120, so as to change the $38^{th}$ channel and the $39^{th}$ channel with a $15^{th}$ channel and an $29^{th}$ channel. The network system 420 may track and determine the UE 430 that approaches the third signage 1121 in the second sector 1120, and may transmit the control command.

The signage (e.g., the third signage 1121 in the second sector 1120) that receives the control command from the network system 420 may broadcast an advertising packet through the 15$^{th}$ channel and the 29$^{th}$ channel in response to the received control command. The UE 430 that exists in the second sector 1120, and approaches the third signage 1121, may perform channel scanning for receiving an advertising packet based on the control command received from the network system 420. The 15$^{th}$ channel and the 29$^{th}$ channel may be added to an adjacent channel and may make an extension.

Additionally or alternatively, the network system 420 may provide a control command to fixedly use only a predetermined channel (e.g., the 37$^{th}$ channel) based on channel information reported by a signage. Alternatively, the network system 420 may sort services of a predetermined category, and may separately allocate a broadcasting channel of a corresponding signage.

Figure 12:
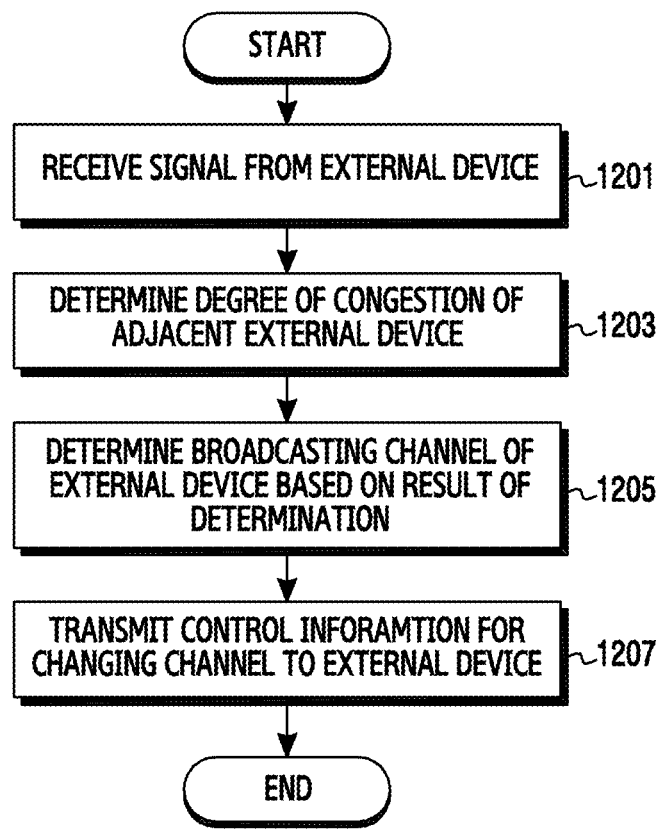
FIG. 12 illustrates an operation method of a network system according to embodiments of the present disclosure.

FIG. 12 illustrates an operation method of a network system according to embodiments of the present disclosure.

FIG. 12 illustrates that a network system adjusts and determines advertising-related information, such as an advertising channel index, and an advertising packet interval, with respect to a signage and a UE based on the result of scanning, such as channel information) received from the signage.

Referring to FIG. 12, in step 1201, a server may obtain a signal from at least one external device. For example, the server may receive a signal transmitted by any one of the signage managed by the server, as described in the descriptions provided with reference to FIG. 11. For example, the signage may perform a channel scanning process with respect to at least one of WiFi, ZigBee, WiGig, and BT(BLE) in various frequency bands, such as 2.4 GHz, 5 GHz, MHz, generate channel information corresponding to Interference, RSSI, CINR, SINR, or C/I, through the scanning process, and transmit the same to the server. The server may receive such channel information from at least one signage managed by the server.

In step 1203, the server determines the degree of congestion around an external device based on the received signal. For example, based on at least some of the data (e.g., channel information) received from a signage, the server may analyze the degree of congestion of a WiFi channel based on a region (around a signage) where the corresponding signage is installed (located). As illustrated in FIG. 11, the server may determine that a WiFi channel, such as a first channel, a 6$^{th}$ channel, and an 11$^{th}$ channel, is congested in the first sector 1110, and may determine that a WiFi channel, such as a 4$^{th}$ channel, a 9$^{th}$ channel, and a 14$^{th}$ channel, is congested in the second sector 1120. When the region where the WiFi channel is congested is determined, the server may expect that the performance of a BT(BLE) channel, such as a 38$^{th}$ channel and a 39$^{th}$ channel, significantly deteriorates in the corresponding region.

In step 1205, the server determines a broadcasting channel of the external device based on the result of determination. When it is determined that congestion exists based on the result of determining the degree of congestion, the server adjusts and determines advertising-related information based on the received channel information. For example, the server may adjust and determine the advertising-related information based on a time, a frequency, or a region (location) for the transmission of an advertising packet of a signage, and may generate control information corresponding thereto.

In step 1207, the server transmits the control information for changing a channel to the external device, based on the determined broadcasting channel. According to embodiments of the present disclosure, the server transmits the control information to a corresponding signage in the form of a message or in the form of a push notification. The server may transmit the control information to a UE existing at the adjusted time in the region where the corresponding signage is installed (located), in the form of a message or a push notification. A signage that receives the control information from the server may change and set, based on the control information, an advertising channel index, an advertising packet interval, and the like, and may broadcast an advertising packet based thereon. The UE that receives the control information from the server may change and set an advertising channel index, an advertising packet interval, and the like in a framework based on the control information, and may perform scanning and discovery for receiving an advertising packet based thereon.

Figure 13:
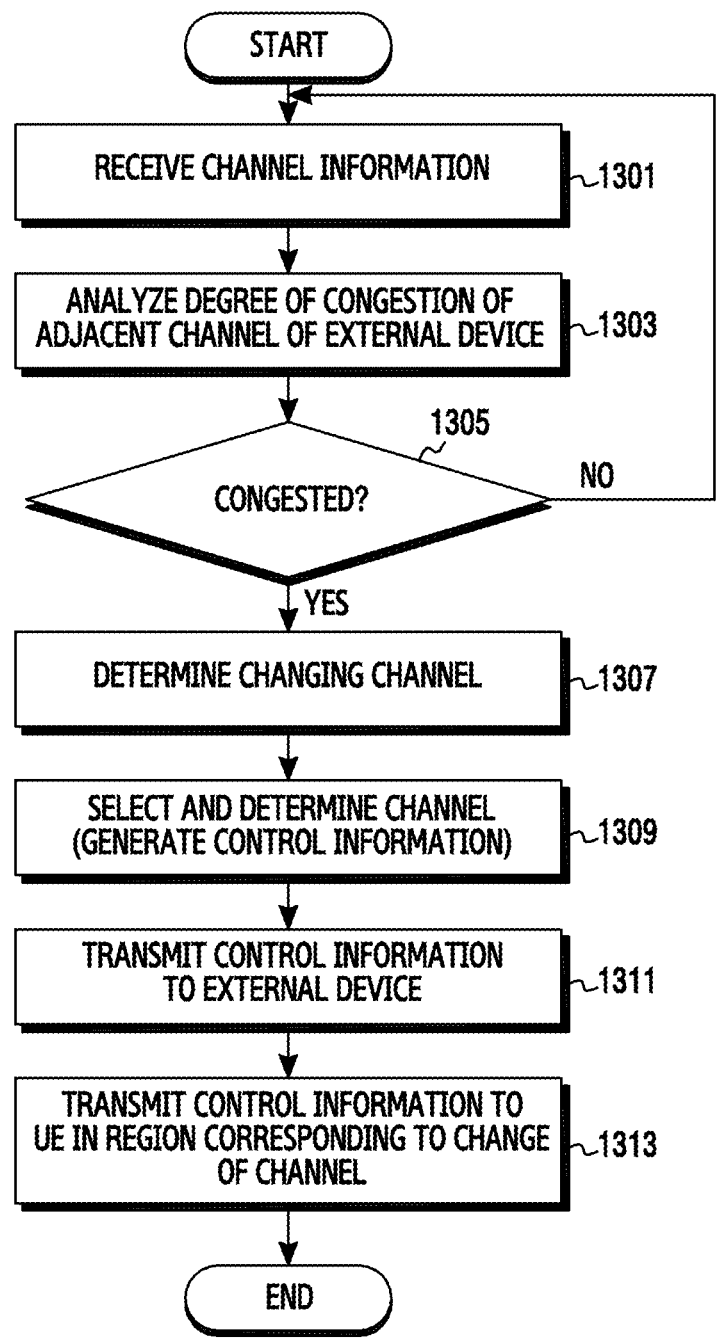
FIG. 13 illustrates an operation method of a network system according to embodiments of the present disclosure.

FIG. 13 illustrates an operation method of a network system according to embodiments of the present disclosure.

Referring to FIG. 13, in step 1301, a server receives channel information. For example, the server generates channel information based on Interference, RSSI, CINR, SINR, C/I, and the like that are measured by at least one external device, such as at least one signage managed by the server, through a scanning process, and may transmit the channel information to a connected server. The server may receive at least one piece of channel information from at least one signage managed by the server.

The server analyzes the degree of congestion of an adjacent channel around an external device (based on the region of the external device) in step 1303, and determines whether the congestion exists based on the result of determining the degree of congestion. For example, when the channel information is received from the signage, the server may determine, based on the channel information, whether a WiFi channel is congested based on the region where the corresponding signage is installed (located). According to an embodiment of the present disclosure, as described above, the server may determine that a WiFi channel, such as a 1$^{st}$ channel, a 6$^{th}$ channel, and an 11$^{th}$ channel, is congested in the first sector 1110, and may determine that a WiFi channel, such as a 4$^{th}$ channel, a 9$^{th}$ channel, and a 14$^{th}$ channel, is congested in the second sector 1120.

When it is determined that an adjacent channel (e.g., a WiFi channel) of the corresponding signage is not congested (No in step 1305), the server returns to step 1301, and may perform the subsequent operations of step 1301.

When it is determined that the adjacent channel of the corresponding signage is congested in step 1305 (Yes in step 1305), the server determines to change a channel (e.g., a broadcasting channel or an advertising channel) for broadcasting an advertising packet of the corresponding signage in step 1307. When it is determined that the adjacent channel of the signage is congested, the server may control the corresponding signage, such as the third signage 1121 of the second sector 1120, to not temporarily broadcast an advertising packet in a 38$^{th}$ channel or a 39$^{th}$ channel that is currently allocated for broadcasting. Also, generally, the server may determine, as a substitute, a predetermined frequency band that is capable of transmitting a BT/BLE data packet, although it is not determined as a channel for broadcasting. The server may determine to change the 38$^{th}$ channel and the 39$^{th}$ channel with a 15$^{th}$ channel and a 29$^{th}$ channel.

In step 1309, the server selects and determines a channel for broadcasting an advertising packet, based on the determination of changing the channel. For example, the server generates control information to change an existing broadcasting channel with the determined broadcasting channel. The server may generate control information to change the 38$^{th}$ channel and the 39$^{th}$ channel with the 15$^{th}$ channel and the 29$^{th}$ channel, respectively.

In step 1311, the server transmits the generated control information to the external device. For example, the server may transmit the control information to a corresponding signage, such as the third signage 1121 of the second sector 1120, so as to control changing of a channel for broadcasting an advertising packet.

In step 1313, the server transmits the generated control information to a UE in a region corresponding to the external device. For example, the server may transmit control information so as to inform a UE, which exists in a region where a corresponding signage is installed (located), of a channel through which an advertising packet is broadcasted.

An external device, such as the third signage 1121 of the second sector 1120, that receives the control information from the server may change an existing broadcasting channel corresponding to the control information, and may broadcast an advertising packet based on the changed broadcasting channel. Also, a UE that receives the control information from the server, such as the UE 430 that exists in (approaches or enters) the region where the third signage 1121 of the second sector 1120 is installed, may scan a broadcasting channel for an advertising packet based on the control information.

As described above, an operation method of an electronic device according to embodiments of the present disclosure may include receiving data including at least one signal from a first external device through a communication module, determining at least one out of a plurality of channels based on the data, and transmitting information associated with the at least one channel to the first external device or a second external device, so that the first external device transmits a broadcasting signal using the at least one channel.

The operation of transmitting may include transmitting the information to the first external device so as to change a channel for transmitting the broadcasting signal, based on the at least one channel, and transmitting the information to the second external device in a region corresponding to the first external device so as to change a channel for receiving the broadcasting signal based on the at least one channel.

The electronic device may be configured to include a server that manages the first external device, and manages the first external device to display service information. The first external device may include selecting target service information from among one or more pieces of service information provided by the server, and transmitting, to the second external device, a request for executing an application corresponding to the target service information.

Figure 14:
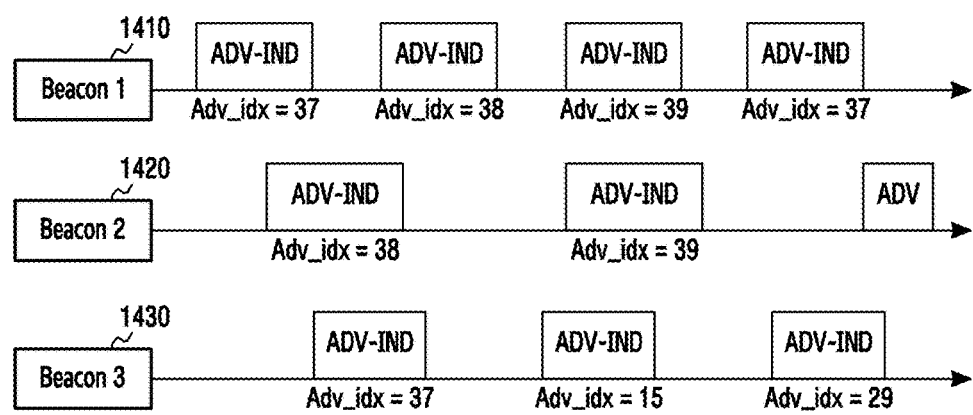
FIG. 14 illustrates an example of allocating a frequency based on a service in a system according to embodiments of the present disclosure.

FIG. 14 illustrates an example of allocating a frequency based on a service in a system according to embodiments of the present disclosure.

Referring to FIG. 14, FIG. 14 separately illustrates normal beacon devices 1410 and 1420, and a beacon device (e.g., a signage 1430) that is operated by a provider.

As illustrated in FIG. 14, the normal beacon device 1410 and 1420 may provide a service by forming a service hierarchy using a major field or a minor field of manufacturer data in an advertisement data zone of the corresponding beacon device 1410 and 1420. Conversely, in the case of the beacon device (e.g., signage 1430) operated by the provider, a channel for an advertising packet may be changed, under the control of the server, to another channel based on the degree of congestion of an adjacent channel, as described in FIG. 11, 12, or 13.

In the case of BLE, an advertising packet interval of the signage 1430 may maintain the time in the range of 20 ms to 10.24 s. The server may determine a packet interval based on the beacon devices 1410 and 1420, a wireless communication device, or a UE, which are distributed in a corresponding region. The server may transmit the determined packet interval to the UE and the signage 1430. Depending on a region, an appropriate advertising packet interval or an appropriate scanning interval may be transmitted.

The server may transfer control information to the UE and the signage 1430 located in the region, respectively, in the form of a message, the control information including the channel change request, such as a command to change a 38$^{th}$ channel and a 39$^{th}$ channel with a 15$^{th}$ channel and a 29$^{th}$ channel, and a request for changing a scan interval (ScanInterval) value and a scan window (ScanWindow) value, which are calculated in the form of Equations (1) and (2). According to embodiments of the present disclosure, the UE and the signage that receive the message may adjust an advertising packet interval or a scanning interval based on the changed channel information and a required reception period. Various numeral values are gradationally applied as the control information, or the control information may be defined to a predetermined value. For example, in the case of the UE, the scan interval may be optimized based on an advertising packet interval broadcasted in a predetermined region, according to the determination made by the server.

Figure 15:
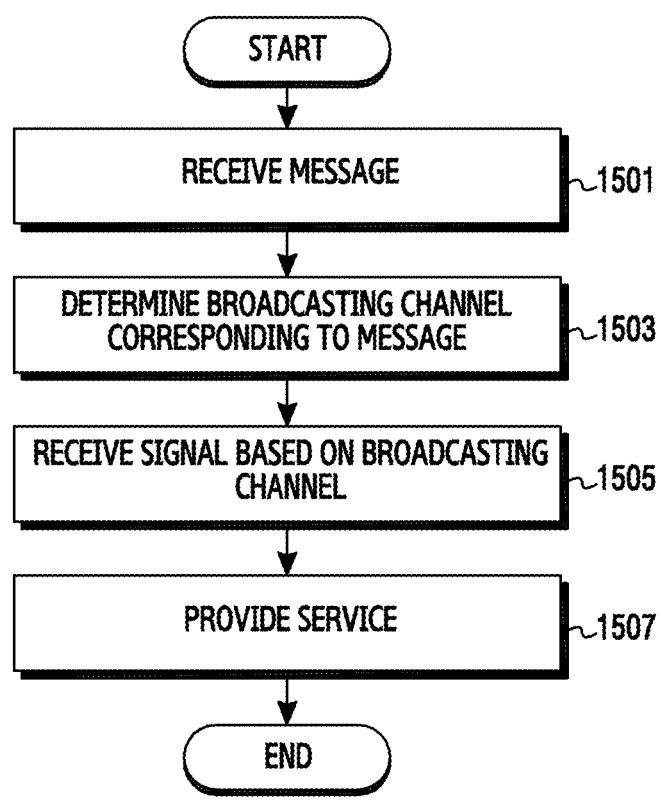
FIG. 15 illustrates an operation method of an electronic device according to embodiments of the present disclosure.

FIG. 15 illustrates an operation method of an electronic device according to embodiments of the present disclosure.

FIG. 15 illustrates that an electronic device is a UE, receives, from a server, information, such as channel information and control information that takes into consideration the environment around a signage, and provides a service based thereon.

Referring to FIG. 15, in step 1501, the electronic device receives a message (signal) from at least one external device. For example, the controller 680 detects that channel information provided from a signage is received from a server through a wireless communication unit (e.g., a mobile communication module), as described in the description provided with reference to FIG. 4. Alternatively, the controller 680 may detect that channel information (e.g., control information) that is changed based on the channel information of a signage is received from a server through a wireless communication unit, as described in the description provided with reference to FIG. 11.

In step 1503, the electronic device determines a broadcasting channel corresponding to the message. For example, the controller 680 may determine a channel for receiving an advertising packet and a scan period with respect to the corresponding channel based on the message. The controller 680 may determine a broadcasting channel for receiving an advertising packet from a signage at the present location based on the channel information received from the server. According to an embodiment of the present disclosure, the controller 680 may set a broadcasting channel and a scan period by changing an allocated broadcasting channel and scan period for receiving an advertising packet from a signage at the present location based on the channel information received from the server.

A UE and a signage may basically use a 37$^{th}$ channel, a 38$^{th}$ channel, and a 39$^{th}$ channel as a broadcasting channel, and may perform a scanning process based the corresponding channel. A broadcasting channel may be additionally changed or added by a signage or a server based on a predetermined region or a predetermined service. As described above, when a broadcasting channel is changed, a UE that performs scanning may generally perform scanning with respect to both a broadcasting channel before changing and a broadcasting channel after changing. This may be applied to the UE as the load caused by scanning. Accordingly, the UE may adjust the interval of channel reception, and may scan a frequency based on the adjusted interval, according to a predetermined sequence. Scanning may be performed periodically according to the sequence of 37->38->39 for the broadcasting channel before changing, and may be performed periodically according to the sequence of 37->38->39--->15->29 for the broadcasting channel after changing.

Additionally or in parallel, according to embodiments of the present disclosure, a frequency may be adjusted. For example, scanning may be repeatedly performed based on the period of 37->38->39--->37->15->29--->37->15->29--->37->38->39--->37->15->29--->37->15->29.

In step 1505, the electronic device receives a signal (an advertising packet) that is broadcasted by a signage based on the broadcasting channel.

In step 1507, the electronic device provides a service in response to the received signal. According to an embodiment of the present disclosure, the controller 680 drives an application corresponding to a received advertising packet, and may provide a service corresponding to a signage in the present region through the application.

In the case of a UE, information associated with user's preference and rejection associated with a service may be set in advance. In this instance, the UE may perform a filtering process by correcting the set information based on information, such as channel information and control information transmitted from the server. For example, the UE may store a white list of a signage, based on the setting associated with a user's preferred service or rejected service. When the UE receives the information from the server, the UE updates the white list based on the received information, and may perform a filtering process for distinguishing a predetermined service or a predetermined signage based on the updated white list. The UE may determine whether to operate an application based on whether a predetermined service or a predetermined signage is included in the white list. The UE may perform the filtering process.

As described above, an electronic device (e.g., a UE) according to embodiments of the present disclosure may include a short-range wireless communication module, and a processor that is functionally connected with the short-range wireless communication module. The processor may be configured to perform receiving channel information to be used for an external device, changing a (scan) period with respect to a channel corresponding to the channel information based on at least the reception, and receiving a signal broadcasted from the external device based on the changed (scan) period.

The processor may be configured to increase the frequency of scanning the channel or to change a (scan) pattern.

As described above, an operation method of an electronic device according to embodiments of the present disclosure may include receiving channel information to be used for an external device, changing a (scan) period with respect to a channel corresponding to the channel information based on at least the reception, and receiving a signal broadcasted from the external device using the changed (scan) period.

Recently, as one of the schemes for improving the efficiency in using a frequency in a cellular system, a technology, of which standardization is actively under way, is inter-terminal direct communication, such as a device-to-device (D2D) communication which refers to a technology in which adjacent UEs directly transmit/receive to/from one another without passing an existing infrastructure, such as a base station, such as an enhanced Node B (eNB), or an access point (AP). For example, a short-range communication technology, such as WiFi Direct, Bluetooth, ZigBee, and NFC, which has already been commercialized, may be classified as a D2D communication technology using an unlicensed band. However, the unlicensed band has limits in securing the quality of service since it is difficult to control interference or service, and has a limited transmission range, which is a drawback. Accordingly, there is desire for a D2D communication technology in a cellular system that uses a licensed band.

UEs existing nearby in the cellular system executes D2D communication, and thus, the load of a BS may be dispersed. The distance of transmission is shorter than that of the BS, and thus, the amount of power consumed of the UE may be reduced and the latency may also be reduced. From the perspective of the entire system, an existing cellular terminal and a D2D terminal share an identical frequency and spatially reuse the frequency, which leads to the improvement in efficiency of using frequencies.

Basically, the difference between the D2D communication and the existing cellular communication is as follows. In the case of the general cellular communication scheme, different UEs communicate via a base station (eNB) and a gateway, such as a serving gateway (SGW)/packet data network gateway (PGW). Conversely, in the case of the D2D communication scheme, the UEs directly communicate based on peer-to-peer (P2P), without a cellular network.

Generally, the procedure of D2D communication may be configured by including: a UE discovery operation for discovering adjacent D2D UEs that are capable of performing D2D communication; a link establishment operation for establishing a radio link with a UE to which data transmission is performed out of different D2D UEs detected from the discovery operation, and a data transmission operation for transmitting data (e.g., traffic) between UEs that establish a radio link therebetween.

The UE discovery operation refers to a process in which a UE that desires to perform D2D communication searches for and identifies an adjacent UE with which the UE desires to perform the transmission/reception of information. To increase the efficiency of D2D communication, it is essential to discover a UE by using a small amount of radio resources and an infrastructure network within a short time. The link establishment operation is for establishing a link for the data transmission between the D2D UEs detected in the UE discovery operation. In the link establishment, channel information is transmitted or received, and the noise and path loss caused therefrom need to be estimated. Generally, the link may be established by transmitting a request signal and receiving a response signal between UEs that desire D2D communication. The data transmission operation indicates the operation in which the communication is actually performed after the link is established between the UEs that desire D2D communication. The data transmission operation differentiates the cellular-based D2D communication from the D2D communication in the unlicensed band that a base station may engage in controlling D2D communication including resource allocation.

However, in the D2D communication technology, a D2D link shares resources with a cellular link and thus, interference may inevitably occur. Therefore, when the interference is not appropriately controlled, D2D communication may experience difficulty and the performance of a cellular user may deteriorate. For example, the interference from a cellular UE to a D2D UE, the interference from the D2D UE to a base station, and the interference between D2D links may occur. Therefore, for the cellular-based D2D communication, it is important that the control of interference be efficiently performed, such as through resource allocation, and power control.

When the cellular-based D2D communication is activated, the capacity of the existing cellular system and user's experience may be improved. The coverage may be enhanced by using a UE relay function. In addition, through D2D communication, based on a location of a mobile user, information associated with shops and products existing within a short distance may be collected, precise positioning inside a room, group communication between people existing in a short distance, a network game, a location-based advertising, and the like are possible. For example, a service corresponding to a beacon-based service as described above, may be provided.

Representatively, the licensed band-based D2D communication technology includes LTE Direct and ProSe which is an LTE-based inter-UE direct communication.

ProSe defines the structure in which the transmission/reception of data is performed directly between UEs without a network, unlike the existing communication between UEs through a network. The UE discovery operation in ProSe is performed based on LTE. The range of the communication between UEs performed after the discovery corresponds to the communication through LTE or WLAN.

The service that is currently discussed in ProSe in the 3GPP standard defines inter-UE direct communication in a disaster condition in which social networking and commercial advertising, cellular network load dispersing, and service of a base station are not smoothly supported. ProSe defines the structure in which the transmission/reception of data is directly performed between UEs without a network, unlike the existing communication between UEs through a network. In the case in which the UEs are connected to an identical base station or different base stations, although data communication is directly performed between UEs, control signals between the UEs need to be transmitted/received through a base station (eNB) and a core network (evolved packet core (EPC)), in ProSe communication. Through the above, session management, authentication, security, and the like of UEs in network may be provided from the network.

Figure 16:
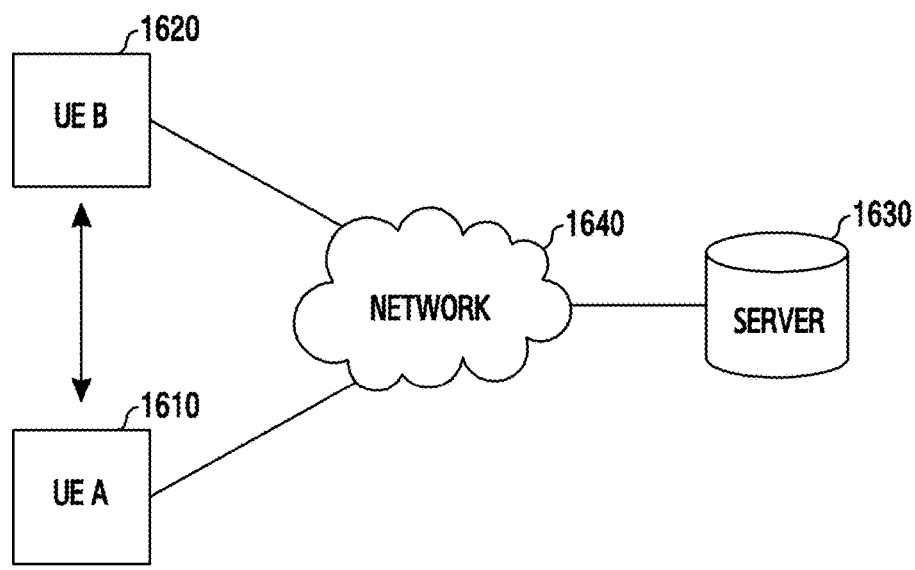
FIG. 16 illustrates operations of an electronic device in a cellular system according to embodiments of the present disclosure.

FIG. 16 illustrates operations of an electronic device in a cellular system according to embodiments of the present disclosure.

As illustrated in FIG. 16, a system according to embodiments of the present disclosure may be configured by including various types of UEs, such as a UE A 1610 and a UE B 1620, an external server 1630, a network 1640, and the like. The UE A 1610 of the UEs may perform an operation corresponding to a signage (e.g., a digital signage), and at least one other UE, such as the UE B 1620, may perform an operation corresponding to a UE, as described above. The provider server 1630 may include a ProSe application server, and the network 1640 may include components, such as a base station (eNB), a gateway, such as SGW/PGW or a core network that form a cellular-based system. The UE 1610 (UE A) may have a configuration identical or similar to that of the electronic device 600 of FIG. 6 or the electronic device 700 of FIG. 7.

The UE 1620 (UE B) may have a configuration identical or similar to those of the electronic device 600 of FIG. 6. The UE 1610 (UE A) and the UE 1620 (UE B) may be embodied by including a communication module, such as an LTE direct communication module for D2D communication, a communication module for cellular communication, a processor that is functionally connected with a communication module.

Referring to FIG. 16, the UE 1610 (UE A) may receive predetermined data, such as an advertisement and product price information, from the external server 1630, such as a provider server or a $3^{rd}$ party server, through the network 1640. The UE 1610 (UE A) may update existing data based on the received data, and may output (display) the received data through a display based on the result of updating.

The UE 1620 (UE B) receives the data that the UE 1610 (UE A) transmitted through D2D communication. When the UE 1620 (UE B) receives data from the UE 1610 (UE A), the UE 1620 (UE B) may drive an application corresponding to the received data.

The external server 1630 may transmit predetermined data (e.g., an advertisement, product price information, or the like) to the UE 1610 (UE A), and may execute a control to display the predetermined data through a display of the UE 1610 (UE A), and to update the predetermined data. The data (or information) managed by the provider server 1630 may include the location of the UE 1610 (UE A), detailed information, a battery state, a screen state, the intensity of a signal in association with the base station, information associated with the UE 1610 (UE A), such as a device ID, and information associated with a radio wave signal, such as an allocated channel index, and an advertise packet interval.

In the system as described in FIG. 16, the UE 1610 (UE A) may be difficult to avoid interference from an adjacent device due to various adjacent devices. Therefore, it is difficult to discover a target UE, such as the UE 1620 (UE B) for transmitting an advertising packet through D2D communication. The UE 1610 (UE A) may interwork with the provider server 1630. For example, the provider server 1630 may include a cellular-based provider server and a server that manages the UE 1610 (UE A) that operates as a signage. The UE 1610 (UE A) may interwork with the provider server 1630 through the network 1640 based on cellular communication.

The UE 1610 (UE A) may generate channel information by measuring and calculating interference, RSSI, CINR, SINR, CII, or the like through the scanning process as described above. The UE 1610 (UE A) may determine a radio link that is capable of communicating with the UE 1620 based on the collected channel information.

The radio link and the channel information determined in the UE 1610 (UE A) may be transmitted to the provider server 1630 that manages the corresponding UE 1610 (UE A). For example, the provider server 1630 may store the radio link, the channel (an advertising channel received in a communication module) information, together with a device ID, and may transmit the same to the UE 1620 (UE B) that exists nearby the UE 1610 (UE A) through the network 1640.

The UE 1610 (UE A) that operates as a signage may obtain a signal in a resource area set for LTE Direct Discovery, through a communication module. The UE 1610 (UE A) may determine some resource area out of the resource area based on the intensity of the obtained signal. The UE 1610 (UE A) may transmit an LTE direct discovery signal using the determined some resource area.

As described above, an electronic device according to embodiments of the present disclosure may include a communication module that is configured to establish a connection with an external device, and may include a processor that is functionally connected with the communication module. The processor may be configured to perform obtaining, through the communication module, a signal in a resource area set for discovering an adjacent device that is capable of performing D2D communication, determining some resource area out of the resource area based on the intensity of the obtained signal, and transmitting a discovery signal using the determined some resource area.

As described above, an operation method of an electronic device according to embodiments of the present disclosure may include obtaining, through a communication module, a signal in a resource area set for discovering an adjacent device that is capable of performing D2D communication, determining some resource area out of the resource area, based on the intensity of the obtained signal, and transmitting a discovery signal using the determined some resource area.

As described above, according to a discovery improvement method and apparatus of an electronic device according to embodiments of the present disclosure, in the environment where IoT devices, including a signage, and beacon devices are installed inside and outside, when a UE accesses, an IoT device is promptly and accurately discovered, and thus, the amount of power that a UE consumes for the reception may be reduced. The method and apparatus may support the UE to efficiently filter a predetermined beacon device for receiving a service.

According to embodiments of the present disclosure, an IoT device, such as a signage, may directly measure measurable frequency (channel) information, and may interwork with a server that manages a beacon device, so that a UE may promptly and accurately discover an advertising and sensing solution which is appropriate from the perspective of a region and a service and may reduce the amount of battery power consumed for reception.

The embodiments of the present disclosure are merely specific examples presented in order to easily describe technical details of the present disclosure and to help the understanding of the present disclosure, and are not intended to limit the scope of the present disclosure. Therefore, it should be construed that, in addition to the embodiments disclosed herein, all modifications and changes or modified and changed forms derived from the technical idea of the present disclosure fall within the scope of the present disclosure.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

What is claimed is:

1. An electronic device, comprising:
a wireless communication module; and
a processor configured to:
transmit a broadcasting signal using at least one first channel predetermined among a plurality of channels, through the wireless communication module,
identify at least one channel used to transmit at least one signal by at least one external device, using the wireless communication module,
determine whether the at least one channel overlaps the at least one first channel,
determine at least one second channel among a remainder of the plurality of channels when the at least one channel overlaps the at least one first channel, and
transmit another broadcasting signal using the at least one second channel, through the wireless communication module.

2. The electronic device of claim 1, wherein the processor is further configured to:
transmit an indication representing the at least one second channel to another external device; and
transmit the another broadcasting signal to the another external device, using the at least one second channel.

3. The electronic device of claim 2, wherein the processor is further configured to:
transmit the indication to a server so that the server transmits the indication to the another external device.

4. The electronic device of claim 1,
wherein the plurality of channels are for a first short range-wireless communication, and
wherein the at least one channel is included in the plurality of channels.

5. The electronic device of claim 1,
wherein the plurality of channels are for a first short range-wireless communication, and
wherein the at least one channel is for a second short range-wireless communication.

6. The electronic device of claim 1, wherein the processor is further configured to:
transmit the another broadcasting signal using the at least one first channel when the at least one channel does not overlap the at least one first channel.

7. The electronic device of claim 1, wherein the processor is further configured to:
determine the at least one second channel among the remainder of the plurality of channels so that the at least one second channel does not overlap the at least one channel.

8. An electronic device, comprising:
a communication module; and
a processor configured to:
receive data, through the communication module, on a plurality of channels scanned by a first external device that transmits a broadcasting signal using at least one first channel predetermined among the plurality of channels,
identify at least one channel used to transmit at least one signal by at least another first external device based on the data,
determine whether the at least one channel overlaps the at least one first channel,
determine at least one second channel among a remainder of the plurality of channels when the at least one channel overlaps the at least one first channel, and
transmit information associated with the at least one second channel to the first external device through the communication module so that the first external device transmits another broadcasting signal using the at least one second channel.

9. The electronic device of claim 8, wherein the processor is further configured to:
transmit the information associated with the at least one second channel to at least one second external device so that the at least one second external device receives the another broadcasting signal using the at least one second channel.

10. The electronic device of claim 8, wherein the processor is further configured to:
determine the at least one second channel among the remainder of the plurality of channels so that the at least one second channel does not overlap the at least one channel.

11. An operation method of an electronic device, the method comprising:
transmitting a broadcasting signal using at least one first channel predetermined among a plurality of channels;
identifying at least one channel used to transmit at least one signal by at least one external device;
determining whether the at least one channel overlaps the at least one first channel;
determining, when the at least one channel overlaps the at least one first channel, at least one second channel among a remainder of the plurality of channels; and
transmitting another broadcasting signal using the at least one second channel.

12. The method of claim 11, wherein transmitting the another broadcasting signal comprises:
transmitting an indication representing the at least one second channel to another external device; and
transmitting the another broadcasting signal to the another external device, using the at least one second channel.

13. The method of claim 12, wherein transmitting the indication comprises:
transmitting the indication to a server so that the server transmits the indication to the another external device.

14. The method of claim 11,
wherein the plurality of channels are for a first short range-wireless communication, and
wherein the at least one channel is included in the plurality of channels.

15. The method of claim 11,
wherein the plurality of channels are for a first short range-wireless communication, and
wherein the at least one channel is for a second short range-wireless communication.

16. The method of claim 11, further comprising:
transmitting, when the at least one channel does not overlap the at least one first channel, the another broadcasting signal using the at least one first channel.

17. The method of claim 11, wherein determining the at least one second channel comprises:
determining the at least one second channel among the remainder of the plurality of channels so that the at least one second channel does not overlap the at least one channel.

18. An operation method of an electronic device, the method comprising:
receiving data on a plurality of channels scanned by a first external device that transmits a broadcasting signal using at least one first channel predetermined among the plurality of channels;
identifying at least one channel used to transmit at least one signal by at least another first external device based on the data;
determining at least one second channel among a remainder of the plurality of channels when the at least one channel overlaps the at least one first channel; and
transmitting information associated with the at least one second channel to the first external device through the communication module so that the first external device transmits another broadcasting signal using the at least one second channel.

19. The method of claim 18, further comprising:
transmitting the information associated with the at least one second channel to at least second external device so that the second external device receives the another broadcasting signal using the at least one second channel.

20. The method of claim 18, wherein determining the information associated with the at least one second channel comprises:
determining the at least one second channel among the remainder of the plurality of channels so that the at least one second channel does not overlap the at least one channel.

* * * * *